United States Patent
Miyoshi et al.

(10) Patent No.: US 7,756,993 B2
(45) Date of Patent: Jul. 13, 2010

(54) REPRODUCING APPARATUS, REPRODUCING METHOD, AND REPRODUCING PROGRAM

(75) Inventors: Ryuta Miyoshi, Tokyo (JP); Susumu Yamahara, Tokyo (JP); Taro Konno, Kanagawa (JP); Junichi Aramaki, Chiba (JP); Hiroyuki Kikkoji, Tokyo (JP)

(73) Assignee: Sony Corporation, Tokyo (JP)

( * ) Notice: Subject to any disclaimer, the term of this patent is extended or adjusted under 35 U.S.C. 154(b) by 1024 days.

(21) Appl. No.: 11/452,401

(22) Filed: Jun. 14, 2006

(65) Prior Publication Data

US 2007/0005793 A1    Jan. 4, 2007

(30) Foreign Application Priority Data

Jun. 22, 2005   (JP) .............................. 2005-182303
Jun. 22, 2005   (JP) .............................. 2005-182304

(51) Int. Cl.
*G06F 15/173* (2006.01)
(52) U.S. Cl. ..................................................... 709/231
(58) Field of Classification Search ................. 709/231, 709/228, 217, 218, 219; 707/10; 725/100
See application file for complete search history.

(56) References Cited

U.S. PATENT DOCUMENTS

| | | | |
|---|---|---|---|
| 6,389,467 B1 | 5/2002 | Eyal | |
| 6,484,199 B2 | 11/2002 | Eyal | |
| 6,519,648 B1 | 2/2003 | Eyal | |
| 6,721,741 B1 | 4/2004 | Eyal et al. | |
| 6,725,275 B2 | 4/2004 | Eyal | |
| 6,735,628 B2 | 5/2004 | Eyal | |
| 6,785,671 B1* | 8/2004 | Bailey et al. | 707/3 |
| 7,010,537 B2 | 3/2006 | Eyal et al. | |
| 7,124,125 B2* | 10/2006 | Cook et al. | 707/1 |
| 7,216,178 B2* | 5/2007 | Juszkiewicz | 709/231 |
| 7,222,183 B2* | 5/2007 | Juszkiewicz | 709/231 |
| 7,249,147 B2* | 7/2007 | Juszkiewicz | 707/104.1 |
| 7,395,259 B2* | 7/2008 | Bailey et al. | 707/3 |
| 2002/0023014 A1* | 2/2002 | Hughes et al. | 705/26 |
| 2002/0023015 A1* | 2/2002 | Hughes et al. | 705/26 |
| 2002/0035519 A1 | 3/2002 | Takizawa | |
| 2002/0194216 A1 | 12/2002 | Kanno et al. | |
| 2003/0149628 A1* | 8/2003 | Abbosh et al. | 705/16 |
| 2008/0250026 A1* | 10/2008 | Linden et al. | 707/10 |

FOREIGN PATENT DOCUMENTS

EP    1 348 176 A2    10/2003

(Continued)

*Primary Examiner*—Krisna Lim
(74) *Attorney, Agent, or Firm*—Oblon, Spivak, McClelland, Maier & Neustadt, L.L.P.

(57) ABSTRACT

A reproducing apparatus and method is provided. The reproducing apparatus includes a detection device, a list preparation device, and a reproduction device. The detection device is configured to detect acquisition of first page information. The list preparation device is configured to prepare a list of content identification information collected at least from the first page information and from second page information linked from the first page information when the detection device detects the acquisition of the first page information, the content identification information being such as to indicate where streaming content data is availably located. The reproduction device is configured to reproduce the streaming content data upon acquisition, the streaming content data corresponding to the content identification information in the list prepared by the list preparation device.

17 Claims, 16 Drawing Sheets

FOREIGN PATENT DOCUMENTS

| | | |
|---|---|---|
| JP | 5-342284 | 12/1993 |
| JP | 2000-105775 | 4/2000 |
| JP | 2001-22670 | 1/2001 |
| JP | 2001-175679 | 6/2001 |
| JP | 2001-356779 | 12/2001 |
| JP | 2002-24243 | 1/2002 |
| JP | 2002-73053 | 3/2002 |
| JP | 2002-99283 | 4/2002 |
| JP | 2003-15665 | 1/2003 |
| JP | 2003-208426 | 7/2003 |
| JP | 2003-316367 | 11/2003 |
| JP | 2003-317454 | 11/2003 |
| JP | 2004-135077 | 4/2004 |
| JP | 2004-252882 | 9/2004 |
| JP | 2004-260812 | 9/2004 |
| JP | 2005-92477 | 4/2005 |
| JP | 2005-121693 | 5/2005 |
| WO | WO 01/53994 A2 | 7/2001 |
| WO | WO 02/086767 A1 | 10/2002 |

* cited by examiner

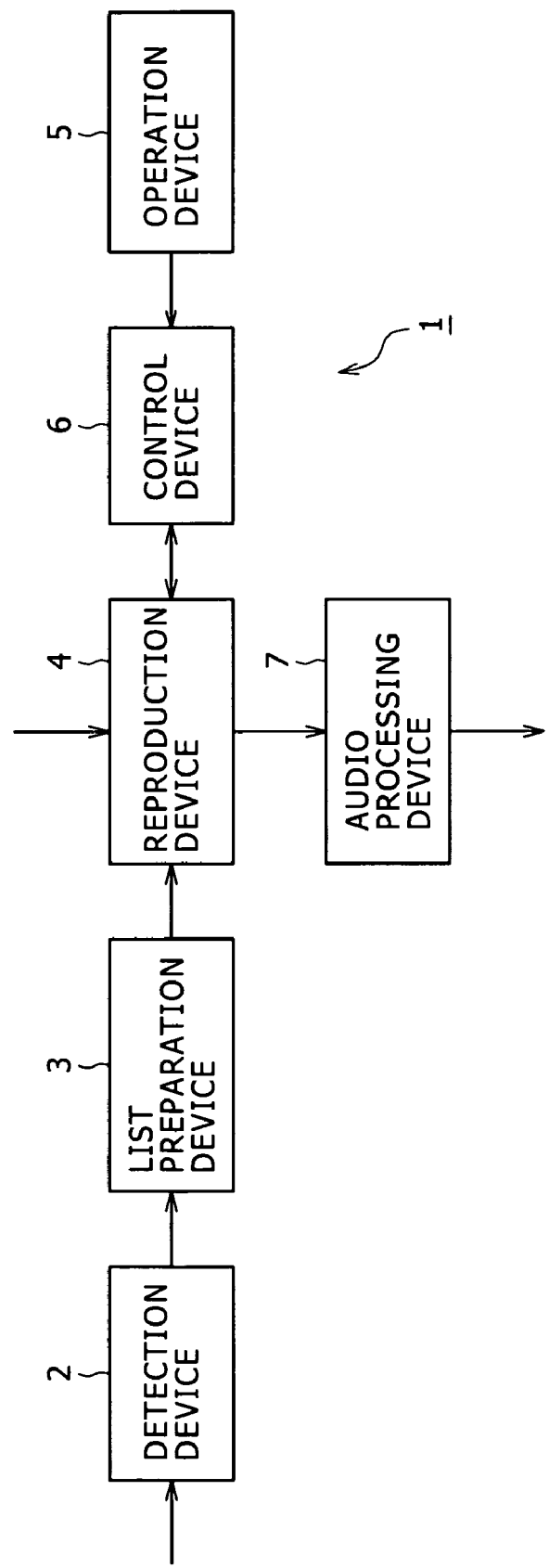
F I G . 1

FIG. 6

| GENRE NAME (34) | SELECTION PAGE ADDRESS (35) | PREVIEW SONG ID INFORMATION (36) | TYPE (37) | BUYING PAGE ADDRESS (38) |
|---|---|---|---|---|
| JAPANESE MUSIC | ○×× | / | / | / |
| WESTERN MUSIC | □△△ | / | / | / |
| JAPANESE MUSIC RANKING | △□○ | / | / | / |
| NEW SONG | ×○× | / | / | / |
| ⋮ | ⋮ | ⋮ | ⋮ | ⋮ |
| CLASSICAL MUSIC | □×○ | △△□ | TYPE A | ××○ |

| ARTIST NAME (40) | SELECTION PAGE ADDRESS (41) | PREVIEW SONG ID INFORMATION (42) | TYPE (43) | BUYING PAGE ADDRESS (44) |
|---|---|---|---|---|
| abcd | ××△ | ○○× | TYPE AA | △×△ |
| efgh | ○△△ | △△× | TYPE BB | □×□ |
| ijkl | □○○ | / | / | / |
| mnop | △×○ | △○○ | TYPE AC | ×△△ |
| ⋮ | ⋮ | ⋮ | ⋮ | ⋮ |
| aceg | ××○ | / | / | / |

| SONG NAME | BUYING PAGE ADDRESS | PREVIEW SONG ID INFORMATION | TYPE |
|---|---|---|---|
| ABCD | ○○○ | □□□ | TYPE AA |
| EFGH | ○△□ | □○△ | TYPE AA |
| IJKL | △△△ | ○×□ | TYPE AA |
| MNOP | □□× | △△○ | TYPE AA |
| ⋮ | ⋮ | ⋮ | ⋮ |
| ACEG | ○×△ | | |

| PREVIEW SONG ID INFORMATION (108) | BUYING PAGE ADDRESS (109) |
|---|---|
| ○○✕ | △✕△ |
| △△✕ | □✕□ |
| △○○ | ✕△△ |
| □□□ | ○○○ |
| □○△ | ○△□ |
| ○✕□ | △△△ |
| ⋮ | ⋮ |
| ○△○ | □○□ |

110

REPRODUCING APPARATUS, REPRODUCING METHOD, AND REPRODUCING PROGRAM

CROSS REFERENCES TO RELATED APPLICATIONS

The present invention contains subject matter related to Japanese Patent Applications JP 2005-182303 and JP 2005-182304 filed with the Japanese Patent Office on Jun. 22, 2005, the entire contents of which being incorporated herein by reference.

BACKGROUND OF THE INVENTION

1. Field of the Invention

The present invention relates to a reproducing apparatus, a reproducing method, and a reproducing program. More particularly, the invention relates to a data storing/reproducing apparatus adapted to acquire music data delivered over a network.

2. Description of the Related Art

At a terminal of a typical music distribution system, a user may start up a web browser screen on a display unit of the terminal and selectively designate preview start buttons on the screen to request previews of desired songs from a web server. In turn, the web server delivers to the terminal the selected songs provided they are saleable, the songs being sent one after another in streaming mode for a predetermined time period each. The terminal then lets the user preview through speakers each of the songs coming in on a streaming basis from the web server and being output for the predetermined time period. One such system is disclosed illustratively in Japanese Patent Laid-open No. 2002-99283 (see pp. 6 to 7, FIGS. 2 and 3).

SUMMARY OF THE INVENTION

The typical music distribution system of the above-outlined structure may allow a plurality of web browser screens each offering previews of songs to be associated with one another. The web browser screens may then be switched as desired to let the user preview the songs of interest. In such a case, the system typically prompts the user to switch the web browser screens manually and to select the preview start buttons every time a different web page screen is displayed. This can be a considerable chore for the user when having the desired songs reproduced for preview purposes.

The present invention has been made in view of the above circumstances and provides a reproducing apparatus, a reproducing method, and a reproducing program for significantly simplifying the operations to be carried out by the user upon reproducing desired content data in streaming mode.

In carrying out the present invention and according to one embodiment of the present invention, there is provided a reproducing apparatus including: a detection device configured to detect acquisition of first page information; a list preparation device configured to prepare a list of content identification information collected at least from the first page information and from second page information linked from the first page information when the detection device detects the acquisition of the first page information, the content identification information being such as to indicate where streaming content data is availably located; and a reproduction device configured to reproduce the streaming content data upon acquisition, the streaming content data corresponding to the content identification information in the list prepared by the list preparation device.

The inventive reproducing apparatus above allows the user simply to perform operations to acquire the first page information. The user's operations trigger automatic acquisition and reproduction of the streaming content data corresponding to the content identification information from the first and the second page information or a plurality of number of items constituting the page information.

In other words, according to the present invention, acquisition of first page information is detected. A list is then prepared of content identification information collected at least from the first page information and from second page information linked from the first page information when the acquisition of the first page information is detected, the content identification information being such as to indicate where streaming content data is availably located. The streaming content data is reproduced upon acquisition, the data corresponding to the content identification information in the prepared list. These actions enable the user simply to carry out operations to acquire the first page information. The user's operations trigger automatic acquisition and reproduction of the streaming content data corresponding to the content identification information from the first and the second page information or a plurality of number of items constituting the page information. As outlined above, the present invention provides a reproducing apparatus, a reproducing method, and a reproducing program derived from the method whereby the operations to be carried out by the user upon reproducing desired content data in streaming mode are significantly simplified.

BRIEF DESCRIPTION OF THE DRAWINGS

FIG. 1 is a block diagram showing a hardware structure of functional circuit blocks constituting a reproducing apparatus practiced as one embodiment of the present invention;

FIG. 6 is a tabular view showing a structure of genre list information;

FIG. 7 is a tabular view showing a structure of artist list information;

FIG. 8 is a tabular view showing a structure of song list information;

FIG. 16 is a tabular view showing a structure of a continuous preview list information;

DETAILED DESCRIPTION OF THE PREFERRED EMBODIMENTS

Figure 2:
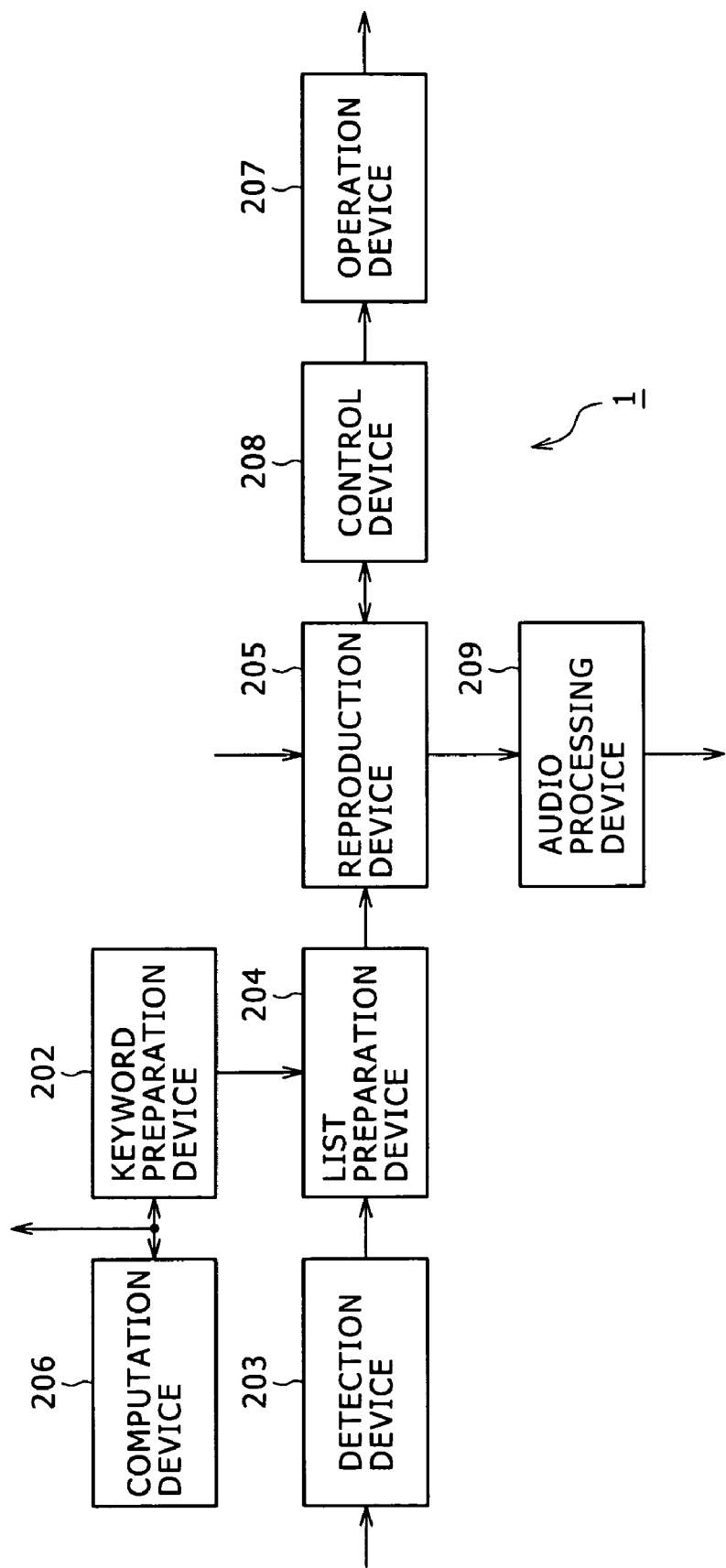
FIG. 2 is a block diagram showing a hardware structure of functional circuit blocks constituting another reproducing apparatus practiced as another embodiment of the present invention.

Preferred embodiments of the present invention will now be described with reference to the accompanying drawings.

(1) First Embodiment

FIG. 1 shows an overall hardware structure of functional circuit blocks constituting a reproducing apparatus 1 practiced as a first embodiment of the present invention. Inside the reproducing apparatus 1 of this structure is a detection device 2 that detects acquisition of first page information. When the detection device 2 detects the acquisition of the first page information, a list preparation device 3 prepares a list of content identification information collected at least from the first page information and from second page information linked from the first page information, the content identification information being such as to indicate where streaming content data is availably located. A reproduction device 4 acquires and reproduces the streaming content data corresponding to the content identification information in the list prepared by the list preparation device 3.

In the above setup, the reproduction device 4 may reproduce the streaming content data in keeping with varying status of the list prepared by the list preparation device 3. When one item of the content identification information is collected by the list preparation device 3 from at least the first and the second page information, the reproduction device 4 may start acquiring and reproducing that item of the streaming content data which corresponds to that one item of the content identification information in the list. When a predetermined number of items of the content identification information are collected by the list preparation device 3 from at least the first and the second page information, the reproduction device 4 may start acquiring and reproducing the predetermined number of items of the streaming content data which correspond to the predetermined number of items of the content identification information in the list. After the list preparation device 3 has collected the content identification information from at least the first and the second page information, the reproduction device 4 may start acquiring and reproducing the streaming content data corresponding to the content identification information in the list.

In addition, the reproduction device 4 may repeatedly acquire and reproduce the streaming content data corresponding to the content identification information in the list prepared by the list preparation device 3. Furthermore, the reproduction device 4 may select as the content identification information of interest one item of the content identification information in the list prepared by the list preparation device 3, acquire that item of the streaming content data which corresponds to the selected content identification information of interest, and reproduce the acquired item of the streaming content data. Upon detecting an end of the reproduction of the acquired item of the streaming content data, the reproduction device 4 may automatically select as the content identification information of interest another item of the content identification information in the list, and proceed likewise to acquire and reproduce that item of the streaming content data which corresponds to the selected content identification information of interest. In this manner, a plurality of items of the streaming content data corresponding to the plurality of items of the content identification information in the list may be acquired and reproduced successively.

In the reproducing apparatus 1, the reproduction device 4 gains access to network addresses associated with the operations to be performed on an operation device 5 under control of a control device 6. Also in the reproducing apparatus 1 is the control device 6 that may update the network addresses associated with specific operations of the operation device 5 in keeping with the streaming content data being reproduced by the reproduction device 4. If the streaming content data is not reproduced by the reproduction device 4, the control device 6 may delete the network addresses associated with the specific operations of the operation device 5. If the network addresses associated with the specific operations to be performed on the operation device 5 are deleted, the control device 6 may reject the operations on the operation device 5. The reproducing apparatus 1 may also have an audio processing device 7 that converts into an audio signal reproduced data acquired by the reproduction device 4 reproducing the streaming content data. If the audio processing device 7 does not output the audio signal while the reproduction device 4 is reproducing the streaming content data, the control device 6 may reject the specific operations to be performed on the operation device 5.

Meanwhile, the list preparation device 3 may prepare the list of the content identification information collected at least from the first and the second page information, the content identification information being such as to indicate which items of the streaming content data are reproducible by the reproduction device 4 and where the reproducible items of the streaming content data are availably located. Alternatively, the list preparation device 3 may prepare the list of the content identification information collected at least from the first and the second page information, the content identification information being such as to indicate which items of the streaming content data are available for preview and where the available items of the streaming content data are availably located.

In the reproducing apparatus 1, as described above, the detection device 2 detects acquisition of first page information. The list preparation device 3 prepares a list of content identification information collected at least from the first page information and from second page information linked from the first page information when the detection device 1 detects the acquisition of the first page information, the content identification information being such as to indicate where streaming content data is availably located. The reproduction device 4 reproduces the streaming content data upon acquisition thereof, the streaming content data corresponding to the content identification information in the list.

The reproducing apparatus 1 above allows the user simply to perform operations to acquire the first page information. The user's operations trigger automatic acquisition and reproduction of the streaming content data corresponding to the content identification information from the first and the second page information or a plurality of number of items constituting the page information.

In other words, according to the first embodiment of the invention, when acquisition of first page information is detected, a list is prepared of content identification information collected at least from the first page information and from second page information linked from the first page information, the content identification information being such as to indicate where streaming content data is availably located. The streaming content data is reproduced upon acquisition thereof, the data corresponding to the content identification information in the prepared list. These actions of the reproducing apparatus 1 enable the user simply to carry out operations to acquire the first page information. The user's operations trigger automatic acquisition and reproduction of the streaming content data corresponding to the content identification information from the first and the second page information or a plurality of number of items constituting the page information. In this manner, the operations to be carried out by the user upon reproducing desired content data in streaming mode are significantly simplified.

(2) Second Embodiment

FIG. 2 shows a hardware structure of functional circuit blocks constituting another reproducing apparatus 1 practiced as a second embodiment of the present invention. Inside the reproducing apparatus 1 of this structure is a keyword preparation device 202 that prepares a keyword based on content data stored on a storage medium (not shown). A detection device 203 detects acquisition of first page information. A list preparation device 204 prepares a list of content identification information collected at least from the first page information and from second page information linked from the first page information when the detection device 203 detects the acquisition of the first page information, the content identification information being such as to indicate where the streaming content data associated with the keyword prepared by the keyword preparation device 202 is availably located. A reproduction device 205 acquires and reproduces the streaming content data corresponding to the content identification information in the list prepared by the list preparation device 204.

In the above setup, the keyword preparation device 202 may prepare a keyword formed by either artist information or genre information corresponding to the content data stored on the storage medium. A computation device 206 included in the reproducing apparatus 1 may compute the number of items constituting the content data either by an artist information or by a genre information when the content data stored on the storage medium is updated, the computation device 206 further storing the computed number of items onto the storage medium. The keyword preparation device 202 may prepare the keyword formed by either the artist information or the genre information of which the number of items to be stored onto the storage medium is at least equal to a predetermined number.

The reproduction device 205 may reproduce the streaming content data in keeping with varying status of the list prepared by the list preparation device 204. Illustratively, when one item of the content identification information is collected by the list preparation device 204 from at least the first and the second page information, the reproduction device 205 may acquire and reproduce that item of the streaming content data which corresponds to that one item of the content identification information in the list. When a predetermined number of items of the content identification information are collected by the list preparation device 204 from at least the first and the second page information, the reproduction device 205 may acquire and reproduce the predetermined number of items of the streaming content data which correspond to the predetermined number of items of the content identification information in the list. After the list preparation device 204 has collected the content identification information from at least the first and the second page information, the reproduction device 205 may acquire and reproduce the streaming content data corresponding to the content identification information in the list.

In addition, the reproduction device 205 may repeatedly acquire and reproduce the streaming content data corresponding to the content identification information in the list prepared by the list preparation device 204 as a form of reproducing a streaming content data. Furthermore, the reproduction device 205 may select as the content identification information of interest one item of the content identification information in the list prepared by the list preparation device 204, acquire that item of the streaming content data which corresponds to the selected content identification information of interest, and reproduce the acquired item of the streaming content data. Upon detecting an end of the reproduction of the acquired item of the streaming content data, the reproduction device 205 may automatically select as the content identification information of interest another item of the content identification information in the list, and proceed likewise to acquire and reproduce that item of the streaming content data which corresponds to the selected content identification information of interest. In this manner, a plurality of items of the streaming content data corresponding to the plurality of items of the content identification information in the list may be acquired and reproduced successively.

In the reproducing apparatus 1, the reproduction device 205 gains access to network addresses associated with the operations to be performed on an operation device 207. Also in the reproducing apparatus 1 is a control device 208 that may update the network addresses associated with specific operations to be carried out on the operation device 207 in keeping with the streaming content data being reproduced by the reproduction device 205. If the streaming content data is not reproduced by the reproduction device 205, the control device 208 may delete the network addresses associated with the specific operations on the operation device 207. If the network addresses associated with the specific operations to be performed on the operation device 207 are deleted, the control device 208 may reject the specific operations on the operation device 207. The reproducing apparatus 1 may also have an audio processing device 209 that converts into an audio signal reproduced data acquired by the reproduction device 205 reproducing the streaming content data. If the audio processing device 209 does not output the audio signal while the reproduction device 205 is reproducing the streaming content data, the control device 208 may reject the specific operations to be performed on the operation device 207.

Meanwhile, the list preparation device 204 may prepare the list of the content identification information collected at least from the first and the second page information, the content identification information being such as to indicate which items of the streaming content data are associated with the keyword and reproducible by the reproduction device 205 and where the reproducible items of the streaming content data are availably located. Alternatively, the list preparation device 204 may prepare the list of the content identification information collected at least from the first and the second page information, the content identification information being such as to indicate which items of the streaming content data are associated with the keyword and available for preview and where the available items of the streaming content data are availably located.

In the reproducing apparatus 1, as described above, the keyword preparation device 202 prepares a keyword based on content data stored on a storage medium. The detection device 203 detects acquisition of first page information. The list preparation device 204 prepares a list of content identification information collected at least from the first page information and from second page information linked from the first page information when the detection device 203 detects the acquisition of the first page information, the content identification information being such as to indicate where the streaming content data associated with the keyword prepared by the keyword preparation device 202 is availably located. The reproduction device 205 acquires and reproduces the streaming content data corresponding to the content identification information in the list.

The reproducing apparatus 1 above allows the user simply to perform operations to acquire the first page information. The user's operations trigger automatic acquisition and reproduction of the streaming content data corresponding to the content identification information from the first and the second page information or a plurality of number of items constituting the page information.

In other words, according to the second embodiment of the present invention, a keyword is prepared based on content data stored on a storage medium. When acquisition of first page information is detected, a list is prepared of content identification information collected at least from the first page information and from second page information linked from the first page information, the content identification information being such as to indicate where the streaming content data associated with the keyword is availably located. The streaming content data corresponding to the content identification information in the list is then acquired and reproduced. These actions of the reproducing apparatus 1 allow the user simply to perform operations to acquire the first page information. The user's operations trigger automatic acquisition and reproduction of the streaming content data corresponding to the content identification information from the first and the second page information or a plurality of number of items constituting the page information. In this manner, the operations to be carried out by the user upon reproducing desired content data in streaming mode are significantly simplified.

(3) Third Embodiment

Figure 3:
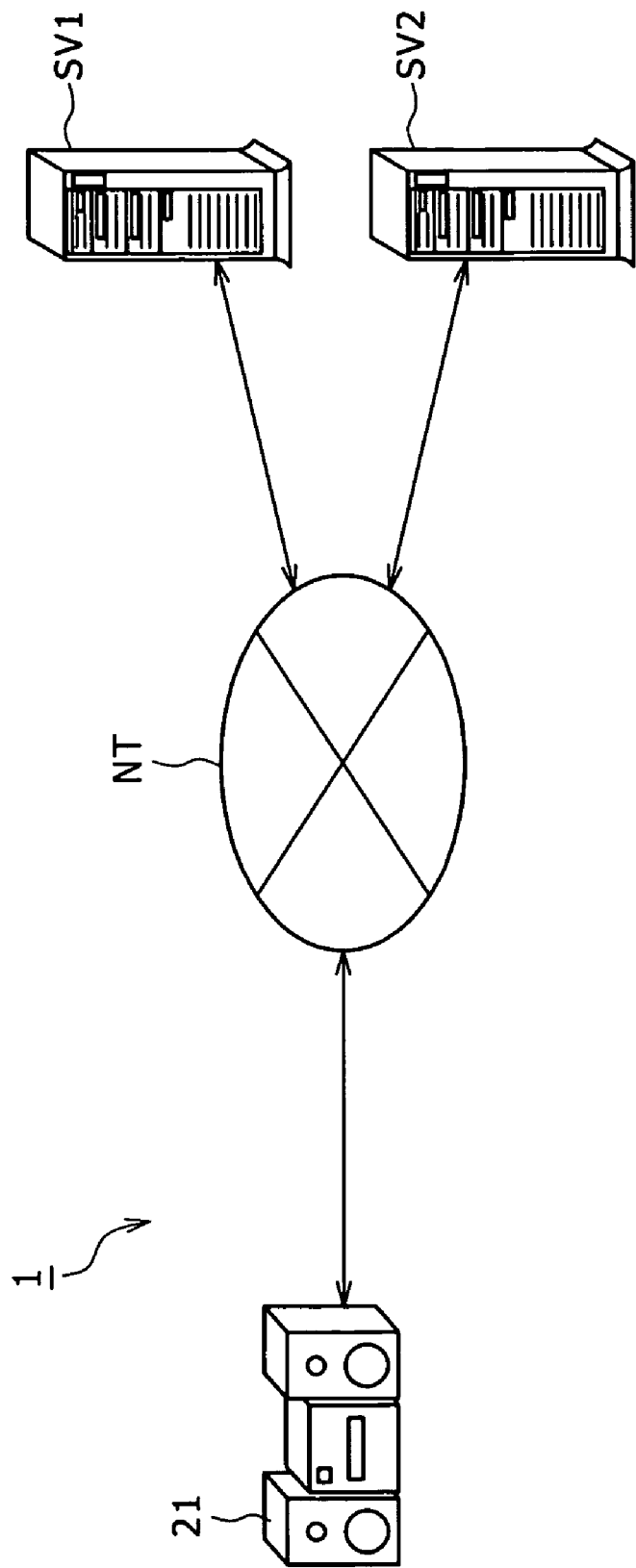
FIG. 3 is a schematic view showing an overall configuration of a music data delivery system practiced as a further embodiment of the present invention.

FIG. 3 outlines a music data delivery system 20 practiced as a third embodiment of the present invention. In the system, a data storing/reproducing apparatus 21 is configured to connect to and communicate with a music data distribution server SV1 and a disk information delivery server SV2 on a network NT. In this setup, the music data distribution server SV1 may distribute a plurality of songs to data storing/reproducing apparatuses 21 as music data in the format of ATRAC3 (Adaptive Transform Acoustic Coding 3), AAC (Advanced Audio Coding), WMA (Windows (registered trademark) Media Audio), RealAUDIO G2 Music Codec, or MP3 (MPEG Audio Layer-3). The disk information delivery server SV2 may hold a CD database that has disk information about each CD (Compact Disc) associated with management information unique to the CD in question. The disk information in the CD database may be delivered to the data storing/reproducing apparatuses 21. The disk information about a given CD may include song name information indicating the names of the songs recorded on the CD in question, reproduction time information indicating the reproduction times of the recorded songs, artist information indicating the names of the artists associated with the songs, and genre information indicating the genre (e.g., Japanese music, Western music) to which the recorded songs belong.

Figure 4:
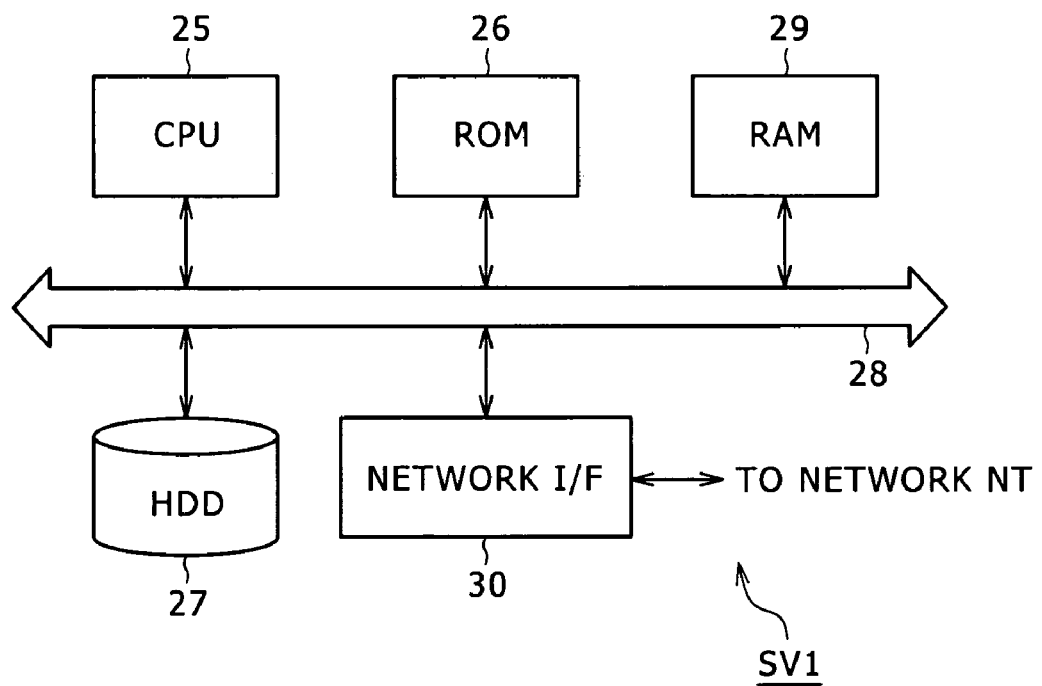
FIG. 4 is a block diagram showing a structure of hardware circuit blocks constituting a music data distribution server SV1.

A typical structure of the hardware circuit blocks constituting the music data distribution server SV1 will now be described with reference to FIG. 4. As illustrated in FIG. 4, the music data distribution server SV1 has a central processing unit (CPU) 25, a ROM (read only memory) 26, a hard disk drive (HDD) 27, a bus 28, a RAM (random access memory) 29, and a network interface 30. The CPU 25 that provides control over the entire server causes diverse programs including basic programs and applications to be loaded from the ROM 26 or hard disk drive 27 into the RAM 29 as needed. By carrying out the programs loaded in the RAM 29, the CPU 25 connects to and communicates with a given data storing/reproducing apparatus 21 through the network interface 30. With the connection established, the CPU 25 may deliver music data to the data storing/reproducing apparatus 21 and carry out related processes.

The hard disk drive 27 retains a large number of music data items that may be downloaded (i.e., delivered) to each data storing/reproducing apparatus 21. The hard disk drive 27 also holds a plurality of preview data items that have been prepared beforehand to let users preview part of the downloadable songs. The hard disk drive 27 further stores attribute information associated with each of the items constituting the downloadable music data. The attribute information includes song name information indicating the name of each stored song, reproduction time information indicating the reproduction time of the song in question, artist information indicating the name of the artist related to the song, and genre information indicating the genre to which the song in question belongs. On the hard disk drive 27, the numerous songs constituting the stored music data are associated with corresponding content identification information (called the downloadable song identification information hereunder). The preview data items are also associated with corresponding content identification information (called the preview song identification information hereunder). The downloadable song identification information and preview song identification information are constituted illustratively by an ID or a network address (i.e., URL (Uniform Resource Locator)) unique to each of the songs making up the music data and preview data. A network address indicates where the corresponding downloadable song or preview song is availably located on the network NT.

In addition, the hard disk drive 27 retains a plurality of items of page information allowing users to select music data constituting the desired songs to be distributed (the information is called the song selection page information hereunder), as well as a plurality of items of page information enabling users actually to download the selected music data (i.e., in order to buy the music data over the network NT; this information is called the song buying page information hereunder). On the hard disk drive 27, the multiple items of song selection page information and song buying page information are associated with corresponding network addresses indicating where each song is availably located on the network NT (i.e., these URLs indicate where the song selection page information and song buying page information are supplied from).

Figure 5:
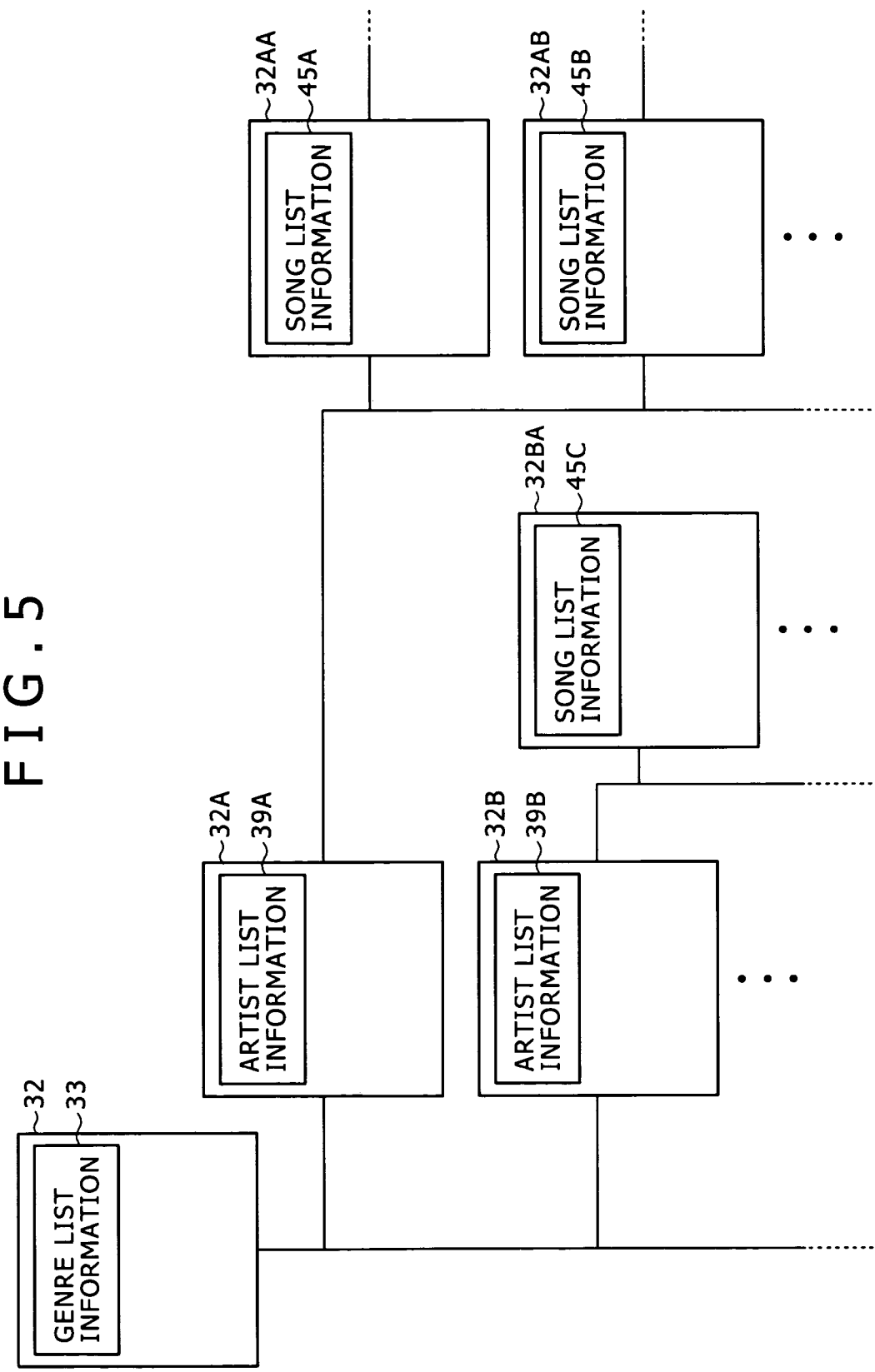
FIG. 5 is a schematic view showing a structure of song selection page information.

As shown in FIG. 5, items of song selection page information 32, 32A through 32BA are written illustratively in XML (extensible markup language). These items of information include diverse kinds of screen element information used to generate song selection screens allowing users to select music data constituting the desired songs by genre and by artist. The items of song selection page information 32, 32A through 32BA are made available on a mutually linked basis in a layered structure that varies with music data type. The structure allows users to isolate their desired songs of a given music data type, layer by layer, from among a large number of downloadable songs. In that case, the song selection page information 32, i.e., the highest of the layered items 32, 32A through 32BA, illustratively includes genre list information 33 as one item of screen element information. As shown in FIG. 6, such genre list information 33 includes a genre list 34 listing the names of the genres for use in selecting a genre as a particular music data type. The genre list information 33 also includes a selection page address list 35 listing network addresses indicating where the items of song selection page information 32A and 32B, one layer below the current page information, are availably located (the addresses are called the selection page addresses), each selection page address being associated with the name of the corresponding genre in the genre list 34. The genre list information 33 further includes a preview song identification information list 36 identifying preview data corresponding to the songs allowed to be previewed in each genre on the side of the music data distribution server SV1, each item of preview song identification information being associated with the name of the corresponding genre in the genre list 34. The genre list information 33 also includes a type list 37 identifying the type of each song allowed to be previewed (i.e., the type is indicated by genre and by artist), each type being associated with corresponding preview song identification information in the preview song identification information list 36. In addition, the genre list information 33 includes a buying page address list 38 indicating the network address of the song buying page information corresponding to each song allowed to be previewed (the network address is called the buying page address hereunder) and indicating where the song in question is availably located, each buying page address being associated with the corresponding preview song identification information in the preview song identification information list 36.

The items of song selection page information 32A and 32B under (e.g., one layer below) the highest-layer song selection page information 32 illustratively include items of artist list information 39A and 39B representative of screen element information. As shown in FIG. 7, the items of artist list information 39A and 39B include an artist list 40 listing the names of artists for use in selecting a desired artist as a music data type. The items of artist list information 39A and 39B also include a selection page address list 41 listing selection page addresses that indicate where the items of song selection page information 32AA through 32BA, one layer below the current page information and linked therefrom, are availably located, each selection page address being associated with the corresponding artist name in the artist list 40. The items of artist list information 39A and 39B further include a preview song identification information list 42 identifying preview data corresponding to the songs allowed to be previewed for each artist on the side of the music data distribution server SV1 and indicating where the preview data is located, each item of preview song identification information being associated with the corresponding artist name in the artist list 40. The items of artist list information 39A and 39B also includes a type list 43 identifying the type of each song allowed to be previewed (i.e., the type is indicated by genre and by artist), each type being associated with the corresponding preview song identification information in the preview song identification information list 42. In addition, the items of artist list information 39A and 39B include a buying page address list 44 that lists the network address of the song buying page information corresponding to each song allowed to be previewed and indicating where the song in question is availably located, each buying page address being associated with the corresponding preview song identification information in the preview song identification information list 42.

Furthermore, the items of song selection page information 32AA through 32BA under (e.g., in the lowest layer) the items of song selection page information 32A and 32B including the items of artist list information 39A and 39B illustratively include items of song list information 45A through 45C representative of screen element information. As shown in FIG. 8, the items of song list information 45A through 45C include a song name list 46 listing the names of songs for use in selecting desired songs. The items of song list information 45A through 45C also include a buying page address list 47 listing buying page addresses that indicate where the items of song buying page information corresponding to selectable songs in the song name list 46 are availably located, each buying page address being associated with the corresponding song name in the song name list 46. The items of song list information 45A through 45C further include a preview song identification information list 48 identifying preview data corresponding to each song allowed to be previewed on the side of the music data distribution server SV1, each item of preview song identification information being associated with the corresponding song name in the song name list 46. The items of song list information 45A through 45C also includes a type list 49 identifying the type of each song allowed to be previewed (i.e., the type is indicated by genre and by artist), each type being associated with the corresponding preview song identification information in the preview song identification information list 48.

In addition, the items of song selection page information 32, 32A through 32BA (FIG. 5) include list identifiers (not shown) arranged to identify the included items of genre list information 33, artist list information 39A and 39B, and song list information 45A through 45C. The items of song selection page information 32, 32A through 32BA further include page identification information unique to each item, the page identification information making it possible to identify each item of song selection page information 32, 32A through 32BA.

Meanwhile, the items of song buying page information are written illustratively in XML. These items of information include diverse kinds of screen element information used to generate song buying screens allowing users to download (i.e., to buy) music data constituting desired songs. The items of song buying page information also include downloadable song identification information indicating where the corresponding items of music data are availably located.

When a data storing/reproducing apparatus 21 requests song selection page information, the CPU 25 reads the highest-layer song selection page information 32 from the hard disk drive 27 and sends the retrieved information to the requesting data storing/reproducing apparatus 21 through the network interface 30. When the data storing/reproducing apparatus 21 requests lower-layer items of song selection page information 32A and 32B in accordance with selection page addresses in the genre list information 33 as part of the song selection page information 32, the CPU 25 reads the corresponding items of song selection page information 32A and 32B from the hard disk drive 27 and sends the retrieved information to the requesting data storing/reproducing apparatus 21 through the network interface 30. When the data storing/reproducing apparatus 21 requests still-lower-layer items of song selection page information 32AA through 32BA in accordance with selection page addresses in the items of artist list information 39A and 39B as part of the lower-layer items of song selection page information 32A and 32B, the CPU 25 reads the corresponding items of song selection page information 32AA through 32BA from the hard disk drive 27 and sends the retrieved information to the requesting data storing/reproducing apparatus 21 through the network interface 30.

As described, the CPU 25 initially supplies the items of song selection page information 32, 32A through 32BA to each data storing/reproducing apparatus 21. Then any data storing/reproducing apparatus 21 may request preview data in accordance with the genre list information 33, with the artist list information 39A and 39B, and with preview song identification information in the items of song list information 45A through 45C as part of the items of song selection page information 32, 32A through 32BA. Given that request, the CPU 25 reads the corresponding preview data from the hard disk drive 27 and sends the retrieved data in streaming mode to the requesting data storing/reproducing apparatus 21 through the network interface 30 in keeping with UDP/IP (User Datagram Protocol/Internet Protocol). In this manner, the CPU 25 allows the user at the data storing/reproducing apparatus 21 to preview desired songs based on the preview data.

The data storing/reproducing apparatus 21 may further request song buying page information in accordance with the genre list information 33, with the artist list information 39A and 39B, and with buying page addresses in the items of song list information 45A through 45C as part of the items of song selection page information 32, 32A through 32BA. Given that request, the CPU 25 reads the corresponding song buying page information from the hard disk drive 27 and sends the retrieved information to the requesting data storing/reproducing apparatus 21 through the network interface 30. The data storing/reproducing apparatus 21 may then request downloading of desired music data in accordance with downloadable song identification information in the song buying page information. In response to that request, the CPU 25 reads the corresponding music data and attribute information from the hard disk drive 27 and sends what has been retrieved to the requesting data storing/reproducing apparatus 21 through the network interface 30. In this manner, the CPU 25 allows the user at the data storing/reproducing apparatus 21 to preview, select, and download the music data constituting the desired songs.

Figure 9:
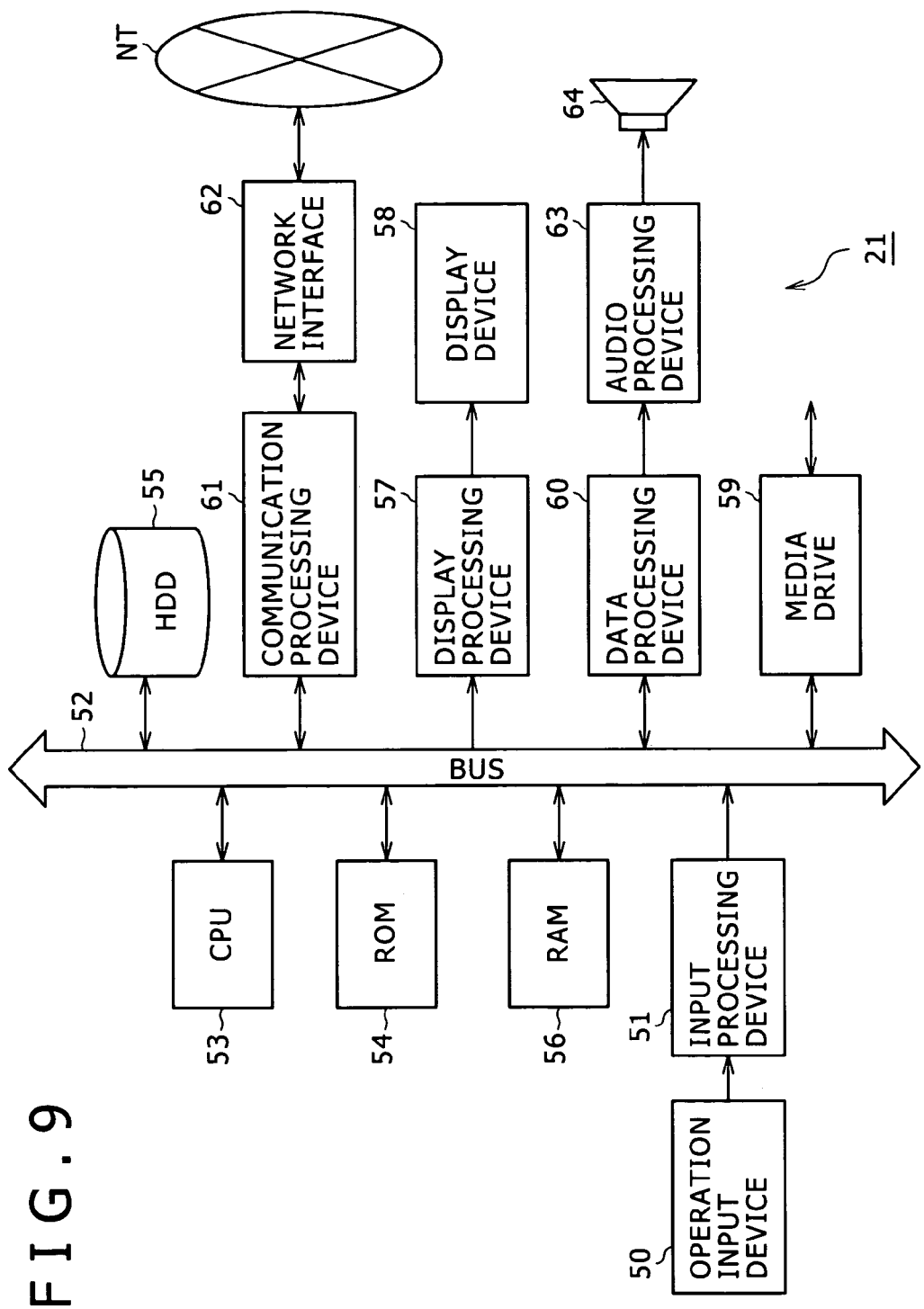
FIG. 9 is a block diagram showing a structure of hardware circuit blocks constituting a data storing/reproducing apparatus.

Described below with reference to FIG. 9 is a hardware circuit structure of the hardware circuit blocks making up the data storing/reproducing apparatus 21. As shown in FIG. 9, the data storing/reproducing apparatus 21 allows the user to operate an operation input device 50 composed of various buttons and controls on the surface of the apparatus enclosure or on a remote controller (not shown). In turn, the operation input device 50 forwards operation input signals reflecting the user's operations to an input processing device 51. The input processing device 51 performs necessary processes to convert the operation input signals coming from the operation input device 50 into operation commands. The commands are sent to a central processing unit (CPU) 53 over a bus 52.

The CPU 53 reads various preinstalled programs such as basic programs and reproduction programs from a ROM 54 or from a hard disk drive 55 over the bus 52, and loads the programs into a RAM 56 that serves as a work area for the CPU 53. In accordance with the programs loaded in the RAM 56, the CPU 53 controls the data storing/reproducing apparatus 21 as a whole while carrying out arithmetic operations and diverse processes in response to the operation commands coming from the input processing device 51.

The CPU 53 then sends the results of arithmetic operations and other diverse processes in connection with the received operation commands as picture data to a display processing device 57. The display processing device 57 performs display-related processes such as digital-to-analog conversion on the picture data coming from the CPU 53, and forwards resulting picture signals to a display device 58. The display device 58 visually presents the user with pictures derived from the received picture signals. Typically, the display device 58 may be an organic electroluminescence display, a liquid crystal display, or a cathode ray tube attached directly to the enclosure or furnished as a separately entity.

Through the operation input device 50, the user may input an operation input signal requesting the recording of music data from a given CD to the hard disk. In that case, the CPU 53 reproduces the recorded music data from the CD and sends the reproduced data to a data processing device 60 through a media drive 59. The CPU 53 then causes the data processing device 60 to perform processes such as compression coding and encryption (called the recording process hereunder) on the received music data before writing the processed data to the hard disk in the hard disk drive 55.

The CD typically has a music data recording area and a management data recording area on its data recording surface. The music data recording area has one or a plurality of items of music data recorded therein. The management data recording area contains management data called TOC (table of contents) specifying the reproduction times of individual music data items, sequence of their reproduction, and reproduction starting locations of the music data items in the music data recording area so as to manage the music data recorded in the music data recording area. When reading music data from the music data recording area of a given CD through the media drive 59, the CPU 53 also retrieves applicable management data from the management data recording area of that CD. Based on the retrieved management data, the CPU 53 creates CD-specific management data and sends the created management data to the disk information delivery server SV2 through a communication processing device 61 and a network interface 62, in that order. In turn, the CPU 53 receives corresponding disk information from the disk information delivery server SV2 through the network interface 62 and communication processing device 61, in that order. The received disk information is fed from the CPU 53 to the hard disk drive 55 for storage onto the hard disk.

Through the operation input device 50, the user may designate music data held on the hard disk drive 55 and input an operation input signal requesting reproduction of the designated data. In such a case, the CPU 53 reads the designated music data from the hard disk of the hard disk drive 55 and sends the retrieved data to the data processing device 60. The data processing device 60 in turn performs processes such as decompression and decryption (called the reproduction process hereunder) on the music data received from the CPU 53, before sending the processed data to an audio processing device 63. The audio processing device 63 carries out audio-related processes such as digital-to-analog conversion on the music data coming from the data processing device 60, and forwards resulting music signals to speakers 64. The speakers 64 under control of the CPU 53 audibly present the user with music derived from the received music signals.

Figure 10:
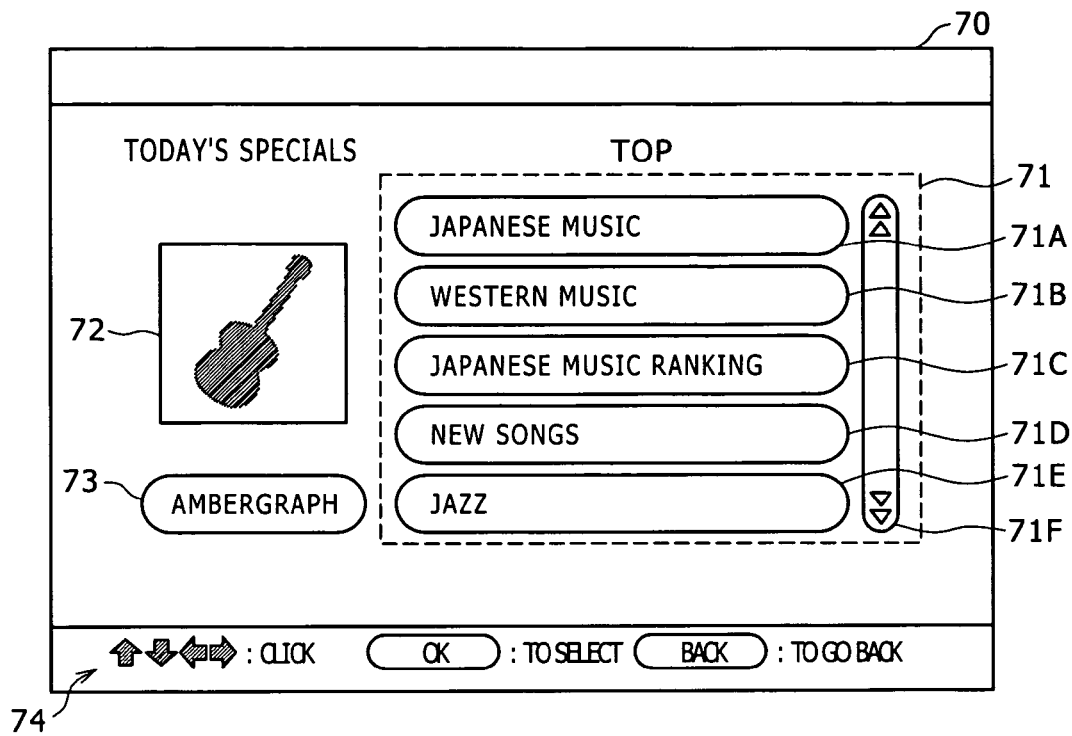
FIG. 10 is a schematic view showing a song selection screen (first screen)

Furthermore, the user may input through the operation input device 50 an operation input signal requesting acquisition of song selection page information 32. In turn, the CPU 53 sends a page information request signal to the music data delivery server SV1 through the communication processing device 61 and network interface 62, in that order. The CPU 53 then receives the highest-layer song selection page information 32 from the music data delivery server SV1 through the network interface 62 and communication processing device 61, in that order. The CPU 53 creates music selection screen data based on the highest-layer song selection page information 32 thus received and sends the created data to the display device 58 through the display processing device 57. The display device 58 under control of the CPU 53 displays a song selection screen 70 based on the received data as shown in FIG. 10.

In that case, on the right-hand side of the song selection screen 70 appears a genre selection area 71 that has a plurality of genre display fields 71A through 71E arranged in the vertical direction of the screen (up/down direction). The genre display fields 71A through 71E in the genre selection area 71 display the names of genres included in the genre list information 33 as part of the song selection page information 32. The genre selection area 71 has a scroll bar 71F for use in selectively changing the genre display fields 71A through 71E being displayed in the genre selection area 71. On the left-hand side of the song selection screen 70 appears a related picture display area 72 that displays a picture related to the song introduced assertively to the user by, say, the music data delivery server SV1 (the song is called the recommended song hereunder). Illustratively, the related picture display area 72 displays a jacket photo of the song in question. Under the related picture display area 72 in the song selection screen 70 is a title display area 73 that displays the title (or artist's name) of the recommended song. At the bottom of the song selection screen 70 is an operation button notification area 74. The operation button notification area 74 shows button marks notifying the user which operation buttons are operable (i.e., effective) for the input of operation commands using the operation buttons of, say, the remote controller (i.e., operation input device 50).

Figure 11:
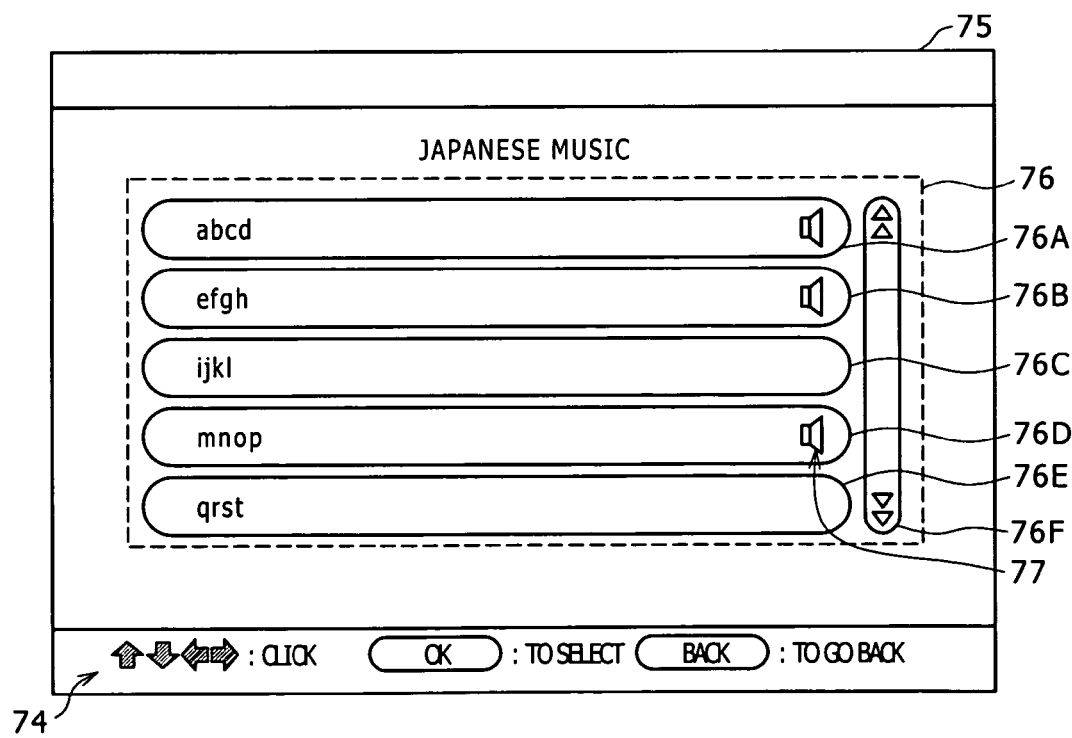
FIG. 11 is a schematic view showing another song selection screen (second screen)

With the song selection screen 70 displayed on the display device 58, the user may selectively designate (i.e., select and decide on) the genre name "Japanese music" in the genre selection area 71. In that case, the CPU 53 sends a page information request signal requesting acquisition of lower-layer song selection page information 32A to the music data delivery server SV1 through the communication processing device 61 and network interface 62, in that order, according to the selection page address corresponding to the genre name "Japanese music" in the genre list information 33 as part of the highest-layer music selection page information 32. In turn, the CPU 53 receives the song selection page information 32A one layer below the highest layer from the music data delivery server SV1 through the network interface 62 and communication processing device 61, in that order. In this case, the CPU 53 generates song selection screen data based on the one-layer-lower music selection page information 32A and forwards the generated data to the display device 58 through the display processing device 57. In this manner, the CPU 53 causes the display device 58 to display a song selection screen 75 such as one shown in FIG. 11.

On that song selection screen 75 appears an artist selection area 76 having a plurality of artist display fields 76A through 76E arranged in the vertical direction. The artist display fields 76A through 76E show artist names included in the artist list information 39A as part of the song selection page information 32A. The artist selection area 76 is furnished with a scroll bar 76F for use in switching the artist display fields 76A through 76E in the area 76. Of the artist name fields 76A through 76E, the fields 76A, 76B and 76D indicate the artist names associated with preview song identification information (i.e., displayed artist names correspond to the songs allowed to be previewed). Illustratively, the artist name fields 76A, 76B and 76D are each given a speaker-shaped mark 77 constituting a preview availability indicator. The indicators 77 on the song selection screen 75 notify the user that the songs of the artists shown in the artist display fields 76A, 76B and 76D are available for preview. At the bottom of the song selection screen 75 is the operation button notification area 74, the same as on the song selection screen 70 shown in FIG. 10.

With the song selection screen 75 displayed on the display device 58, the user may illustratively select the artist name "abcd" associated with a preview song in the artist selection area 76. (The artist display field 76A may illustratively be "highlighted" in a manner different from the other fields.) In that case, the CPU 53 sends a preview request signal requesting preview data to the music data delivery server SV1 through the communication processing device 61 and network interface 62, in that order, according to the corresponding preview song identification information in the artist list information 39A as part of the song selection page information 32A. In turn, the CPU 53 receives the preview data in streaming mode from the music data delivery server SV1 through the network interface 62 and communication processing device 61, in that order. Concurrently, the CPU 53 causes the data processing device 60 to perform the reproduction process on the received preview data before getting the audio processing device 63 to subject the processed data to audio processing. The resulting preview signal is forwarded to the speakers 64. The speakers 64 under control of the CPU 53 audibly present the user with the preview song based on the preview signal. Where the song selection screen 70 is displayed as shown in FIG. 10, the user may preview songs that are allowed to be previewed in association with a particular genre name or names.

Figure 12:
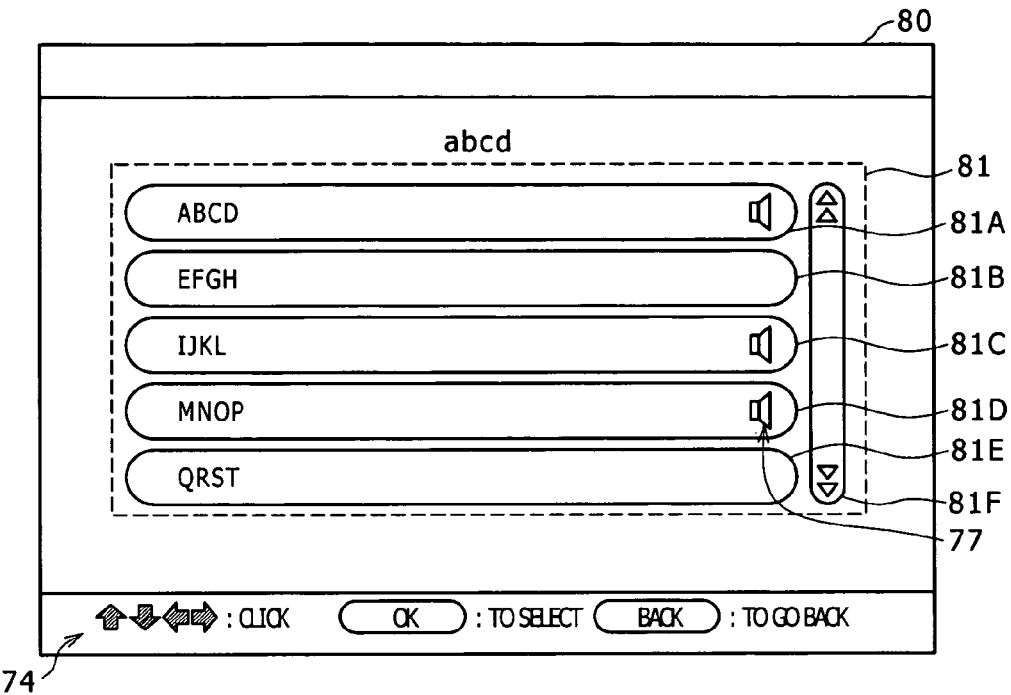
FIG. 12 is a schematic view showing another song selection screen (third screen)

The user may selectively designate, say, the artist name "abcd" in the artist selection area 76 on the song selection screen 75. In that case, the CPU 53 sends a page information request signal requesting acquisition of lower-layer song selection page information 32AA to the music data delivery server SV1 through the communication processing device 61 and network interface 62, in that order, according to the selection page address corresponding to the artist name "abcd" in the artist list information 39A as part of the music selection page information 32A. In turn, the CPU 53 receives the song selection page information 32AA from the music data delivery server SV1 through the network interface 62 and communication processing device 61, in that order. In this case, the CPU 53 generates song selection screen data based on the music selection page information 32AA and forwards the generated data to the display device 58 through the display processing device 57. In this manner, the CPU 53 causes the display device 58 to display a song selection screen 80 such as one shown in FIG. 12.

On that song selection screen 80 appears a song name selection area 81 having a plurality of song name display fields 81A through 81E arranged in the vertical direction. The song name display fields 81A through 81E show song names included in the song list information 45A as part of the song selection page information 32AA. The song name selection area 81 is furnished with a scroll bar 81F for use in switching the song name display fields 81A through 81E in the area 81. Of the song name fields 81A through 81E, the fields 81A, 81C and 81D indicate the song names associated with preview song identification information (i.e., names of the songs allowed to be previewed). The song name fields 81A, 81C and 81D are each given the preview availability indicator 77. The indicators 77 on the song selection screen 80 notify the user that the songs of which the names are shown in the song name display fields 81A, 81C and 81D are available for preview. At the bottom of the song selection screen 80 is the operation button notification area 74, the same as on the song selection screen 70 shown in FIG. 10.

With the song selection screen 80 displayed on the display device 58, the user may illustratively select the song name "ABCD" associated with a preview song in the song name selection area 81. In that case, the CPU 53 sends a preview request signal requesting preview data to the music data delivery server SV1 through the communication processing device 61 and network interface 62, in that order, according to the corresponding preview song identification information in the song list information 45A as part of the song selection page information 32AA. In turn, the CPU 53 receives the preview data in streaming mode from the music data delivery server SV1 through the network interface 62 and communication processing device 61, in that order. Concurrently, the CPU 53 causes the data processing device 60 to perform the reproduction process on the received preview data before getting the audio processing device 63 to subject the processed data to audio processing. The resulting preview signal is forwarded to the speakers 64. The speakers 64 under control of the CPU 53 audibly present the user with the preview song based on the preview signal.

The user may selectively designate, say, the song name "ABCD" in the song name selection area 81 on the song selection screen 80. In that case, the CPU 53 sends a page information request signal requesting acquisition of song buying page information to the music data delivery server SV1 through the communication processing device 61 and network interface 62, in that order, according to the buying page address corresponding to the song name "ABCD" in the song list information 45A as part of the music selection page information 32AA. In turn, the CPU 53 receives the song buying page information from the music data delivery server SV1 through the network interface 62 and communication processing device 61, in that order. In this case, the CPU 53 generates song buying screen data based on the song buying page information and forwards the generated data to the display device 58 through the display processing device 57. In this manner, the CPU 53 causes the display device 58 to display a song buying screen.

On the song buying screen, the user may request downloading of the music data corresponding to the song name "ABCD." In that case, the CPU 53 sends a download request signal requesting downloading of the corresponding music data to the music data delivery server SV1 through the communication processing device 61 and network interface 62, in that order, according to the downloadable music identification information in the song buying page information. In turn, the CPU 53 receives the music data and corresponding attribute information from the music data delivery server SV1 through the network interface 62 and communication processing device 61, in that order. The CPU 53 then forwards the music data as well as the attribute information to the hard disk drive 55 for storage onto the hard disk.

Through the operation input device 50, the user may designate any of the music data acquired from the music data delivery server SV1 and then input an operation input signal requesting reproduction of the designated music data. In that case, the CPU 53 reads the music data in question from the hard disk of the hard disk drive 55 and sends the retrieved data to the data processing device 60. As in earlier examples, the CPU 53 causes the data processing device 60 to perform the reproduction process on the received music data before getting the audio processing device 63 to subject the processed data to audio processing. The resulting music signal is sent to the speakers 64. The speakers 64 under control of the CPU 53 audibly present the user with the song based on the music signal.

Figure 13:
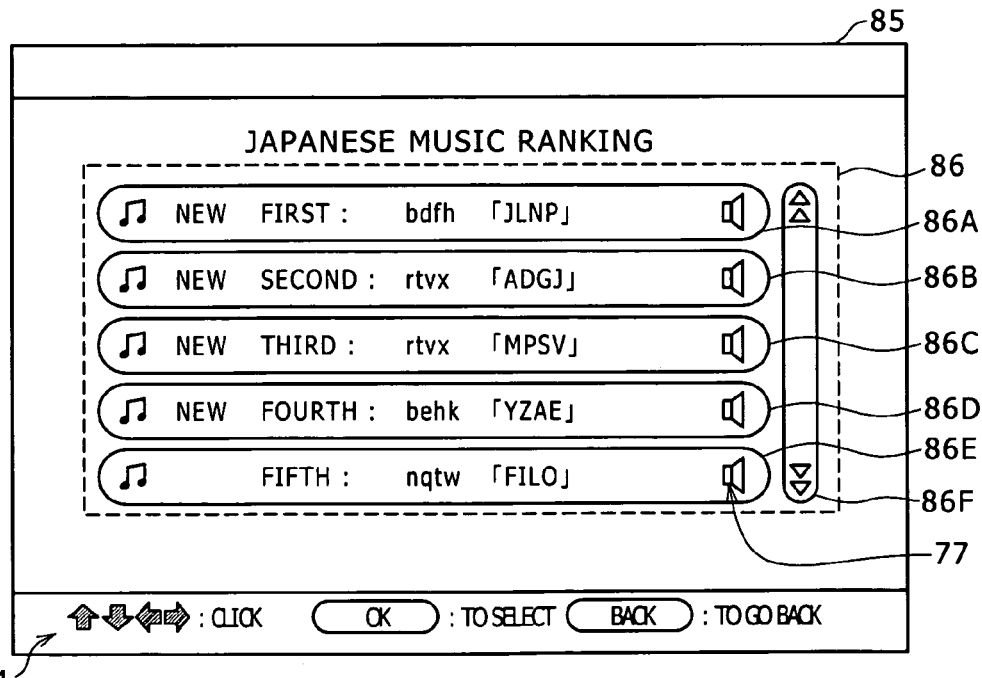
FIG. 13 is a schematic view showing another song selection screen (fourth screen)

With the highest-layer song selection screen 70 displayed on the display device 58, the user may selectively designate the genre name "Japanese music ranking" in the genre selection area 71. In that case, the CPU 53 acquires the corresponding lower-layer song selection page information from the music data delivery server SV1 in the same manner as described above and causes the display device 58 to display a song selection screen 85 such as one shown in FIG. 13. On this song selection screen 85 appears an artist selection area 86 having a plurality of artist display fields 86A through 86E arranged in the vertical direction. The artist display fields 86A through 86E show artist names included in the artist list information as part of the song selection page information. The song selection screen 85 is furnished with a scroll bar 86F in the artist selection area 86. Of the artist display fields 86A through 86E, the fields 86A through 86D indicate the artist names associated with preview song identification information. The artist display fields 86A through 86D are each given the preview availability indicator 77. At the bottom of the song selection screen 85 is the operation button notification area 74, the same as on the song selection screen 70 shown in FIG. 10.

Figure 14:
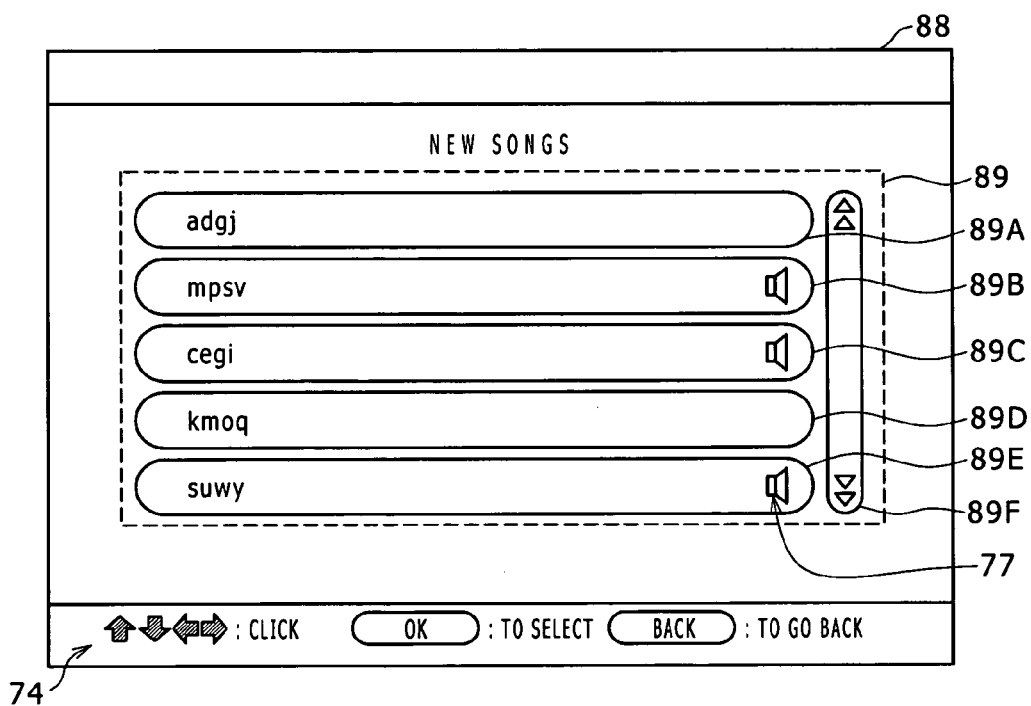
FIG. 14 is a schematic view showing another song selection screen (fifth screen)

With the highest-layer song selection screen 70 displayed on the display device 58, the user may selectively designate the genre name "New songs" in the genre selection area 71. In that case, the CPU 53 acquires the corresponding lower-layer song selection page information from the music data delivery server SV1 in the same manner explained above and causes the display device 58 to display a song selection screen 88 such as one shown in FIG. 14. On that song selection screen 88 appears an artist selection area 89 having a plurality of artist display fields 89A through 89E arranged in the vertical direction. The artist display fields 89A through 89E indicate artist names in the artist list information included in the song selection page information. The song selection screen 88 is furnished with a scroll bar 89F in the artist selection area 89. Of the artist name fields 89A through 89E, the fields 89B, 89C and 89E indicate the artist names associated with preview song identification information. The artist name fields 89B, 89C and 89E are each given the preview availability indicator 77. At the bottom of the song selection screen 88 is the operation button notification area 74, the same as on the song selection screen 70 shown in FIG. 10.

When the song selection screen 85 or 88 appears on the display device 58, as when the song selection screen 75 was shown displayed above, the CPU 53 may acquire preview data and lower-layer song selection page information from the music data delivery server SV1 in response to the user's operations.

Figure 15:
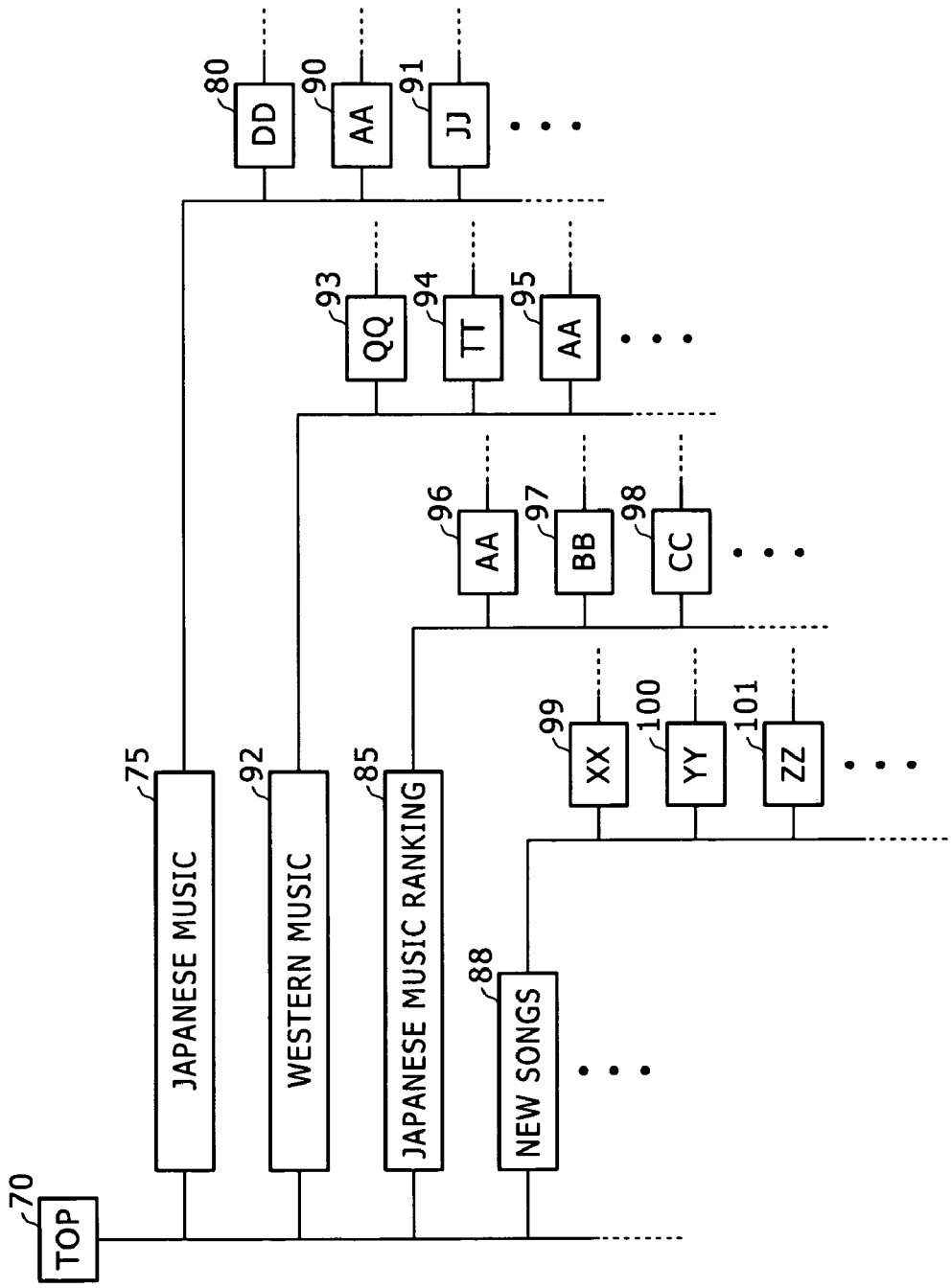
FIG. 15 is a schematic view showing a layered structure of song selection screens.

In the manner described above, after displaying the highest-layer song selection screen 70 on the display device 58, the CPU 53 may change from that screen 70 to the song selection screen 75 that is linked to the song selection screens 80, 90, 91, etc.; or from the screen 70 to the song selection screen 92 that is linked to the song selection screens 93, 94, 95, etc., in response to the user's operations as shown in FIG. 15. Alternatively, on the display device 58, the CPU 53 may change from the highest-layer song selection screen 70 to the song selection screen 85 that is linked to the song selection screens 96, 97, 98, etc.; or from the screen 70 to the song selection screen 88 that is linked to the song selection screens 99, 100, 101, etc., in response to the user's operations. That is, in accordance with the selection page addresses in the song selection page information acquired from the music data delivery server SV1, the CPU 53 may change through the song selection screens 70, 75, 80, 85, 88, 90 through 101, etc., so as to isolate desired songs by type from among numerous downloadable songs.

In addition to the above-described structure, the CPU 53 of the data storing/reproducing apparatus 21 may have a song information database established on the hard disk of the hard disk drive 55. Where music data is read from a given CD for storage onto the hard disk, the CPU 53 stores disk information corresponding to the music data in question (i.e., disk information acquired from the disk information delivery server SV2) into the song information database on the hard disk. When music data is downloaded from the music data delivery server SV1 for storage onto the hard disk, the CPU 53 likewise stores attribute information acquired from the music data delivery server SV1 together with the music data of interest into the song information database on the hard disk.

Every time the song information database on the hard disk is updated by recording of disk information or attribute information thereto (i.e., every time music data is written to the hard disk), the CPU 53 may compute the number of data items constituting the music data held on the hard disk by artist or by genre (i.e., genre-wise or artist-wise music data counts). The genre-wise or artist-wise data counts are stored into the song information database on the hard disk as statistical data in conjunction with the music data stored on the same hard disk. Each time music data is recorded to the hard disk, the CPU 53 updates the related statistical data correspondingly in the song information database. When new statistical data is generated, the CPU 53 checks to determine the number of music data items exceeding a predetermined music data count and detects the genre name or artist name corresponding to the excess music data count. The CPU 53 proceeds to record the detected genre name or artist name as the keyword to the song information database on the hard disk for keyword update. In this manner, the CPU 53 updates the stored keyword from time to time as information indicative of the user's preferences for the music data stored on the hard disk (i.e., songs acquired by the user through the data storing/reproducing apparatus 21).

In the above state, the user may input through the operation input device 50 an operation input signal requesting acquisition of the song selection page information 32. In that case, the CPU 53 sends a page information request signal to the music data delivery server SV1, and checks to determine whether the highest-layer song selection page information 32 has been received from the server SV1. After verifying that the highest-layer song selection page information 32 has been acquired, the CPU 53 generates the song selection screen 70 and causes the display device 58 to display the generated screen 70 in the manner described above. The genre list information 33 is distinguished in the song selection page information 32 through the use of list identifiers. The CPU 53 then compares the types of the type list 37 in the genre list information 33 found in the song selection page information 32, with the keyword stored in the song information database held on the hard disk. The comparison allows the CPU 53 to determine whether the genre list information 33 includes any type that matches the keyword at least in part. If the matching type is found in the genre list information 33, the CPU 53 collects the preview song identification information corresponding to the matching type from the genre list information 33 and acquires the buying page addresses corresponding to the type in question (i.e., corresponding to the collected preview song identification information). As shown in FIG. 15, the CPU 53 then prepares a list 108 of the preview song identification information collected from the genre list information 33 (the list 108 is called the collected identification information list) as well as a list 109 of the collected buying page addresses (the list 109 is called the collected address list). The CPU 53 further prepares list information 110 (called the continuous preview list information) by associating the collected identification information list 108 with the collected address list 109 (i.e., by associating the preview song identification information with the corresponding buying page addresses). The continuous preview list information 110 thus prepared is stored temporarily in the RAM 56 or on the hard disk of the hard disk drive 55.

Following collection of the preview song identification from the genre list information 33 along with the corresponding buying page addresses, the CPU 53 sends a page information request signal to the music data delivery server SV1 automatically (i.e., regardless of the presence or absence of a user-initiated request to acquire the lower-layer items of song selection page information 32A and 32B) in keeping with the selection page addresses in the genre list information 33. The CPU 53 then checks to determine whether the lower-layer items of song selection page information 32A and 32B (i.e., those items of song selection page information 32A and 32B which can be directly linked from the highest-layer song selection page information 32) has been received from the music data delivery server SV1.

After verifying acquisition of the items of song selection page information 32A and 32B one layer below the highest layer, the CPU 53 distinguishes the items of artist list information 39A and 39B within the items of song selection page information 32A and 32B in accordance with list identifiers. The CPU 53 proceeds to compare the types of the type list 43 in the items of artist list information 39A and 39B detected in the items of song selection page information 32A and 32B, with the keyword stored in the song information database held on the hard disk. The comparison allows the CPU 53 to collect the keyword-associated preview song identification information from the items of artist list information 39A and 39B along with the corresponding buying page addresses in the manner described above. The CPU 53 then updates the continuous preview list information 110 by associating the preview song identification information derived from the items of artist list information 39A and 39B with the corresponding buying page addresses and by adding the result of the association to the information 110.

Following collection of the preview song identification from the items of artist list information 39A and 39B along with the corresponding buying page addresses, the CPU 53 sends a page information request signal to the music data delivery server SV1 automatically (i.e., regardless of the presence or absence of a user-initiated request to acquire the lower-layer items of song selection page information 32AA through and 32BA) in keeping with the selection page addresses in the items of artist list information 39A and 39B. The CPU 53 then checks to determine whether the items of song selection page information 32AA through 32BA (i.e., those items of song selection page information 32AA through 32BA which can be directly linked from the items of song selection page information 32A and 32B one layer below the highest layer) have been received from the music data delivery server SV1. After verifying acquisition of the items of song selection page information 32AA through 32BA, the CPU 53 distinguishes the items of song list information 45A through 45C within the items of song selection page information 32AA through 32BA in accordance with list identifiers. In this case, the CPU 53 does not use the keyword in acquiring all preview song identification information included in the items of song list information 45A through 45C found in the items of song selection page information 32AA through 32BA, as well as the buying page addresses corresponding to the acquired preview song identification information. The CPU 53 then updates the continuous preview list information 110 by associating the preview song identification information derived from the items of song list information 45A through 45C with the corresponding buying page addresses and by adding the result of the association to the information 110.

When the user requests acquisition of the highest-layer song selection page information 32, the CPU 53 may illustratively acquire the highest-layer song selection page information 32 substantially constituting at least two layers of information and the one-layer-lower items of song selection page information 32A and 32B on an automatic basis. In so doing, the CPU 53 collects the keyword-associated preview song identification information from the items of song selection page information 32, 32A and 32B along with the corresponding buying page addresses. The CPU 53 proceeds to acquire automatically the lower-layer items of song selection page information 32AA through 32BA and collect all preview song identification information from the acquired song selection page information 32AA through 32BA along with the corresponding buying page addresses. The CPU 53 then prepares the continuous preview list information 110 (FIG. 16) by use of the preview song identification information collected from the items of song selection page information 32, 32A through 32BA along with the corresponding buying page addresses.

Every time the CPU 53 starts collecting preview song identification information by acquiring the highest-layer song selection page information 32 from the music data delivery server SV1, the CPU 53 prepares a collection-used page list for distinguishing the items of song selection page information 32, 32A through 32BA which have been used to collect the preview song identification information in question. The list is stored temporarily in the RAM 56 or on the hard disk of the hard disk drive 55. Every time the CPU 53 uses the items of song selection page information 32, 32A through 32BA in collecting preview song identification information, the CPU 53 supplements the collection-used page list with the page identification information from the items of song selection page information 32, 32A through 32BA used to collect the preview song identification information in question. On the basis of what is described in the collection-used page list, the CPU 53 may determine whether each of the items of song selection page information 32, 32A through 32BA has been used to collect the preview song identification information. As a result, the CPU 53 can avoid using the same items of song selection page information 32, 32A through 32BA in an unproductive, repetitive manner in collecting the preview song identification information.

In keeping with the continuous preview list information 110, the CPU 53 outputs preview songs automatically and continuously for sampling by the user on three occasions: when one item of preview song identification information has been collected from all items of song selection page information 32, 32A through 32BA according to predetermined settings; when a predetermined number of items of preview song identification information have been collected; or when the collection of the preview song identification information from all items of song selection page information 32, 32A through 32BA has ended. More specifically, after starting the automatic and continuous output of preview songs, the CPU 53 automatically selects as the preview song identification information of interest one (e.g., a first) item of the preview song identification information in the listed sequence of the items constituting the preview song identification information within the continuous preview list information 110. In accordance with the preview song identification information selected as the preview song identification information of interest, the CPU 53 requests the corresponding preview data from the music data delivery server SV1. In turn, the CPU 53 receives the preview data in streaming mode from the music data delivery server SV1 through the network interface 62 and communication processing device 61, in that order. The CPU 53 then causes the data processing device 60 to perform the reproduction process on the received preview data before getting the audio processing device 63 to subject the processed data to audio processing. The resulting preview signal is forwarded to the speakers 64. The speakers 64 under control of the CPU 53 audibly present the user with the preview song based on the preview signal.

Upon detecting an end of the reproduction process by the data processing device 60 on the preview data, the CPU 53 automatically selects as the preview song identification information of interest another item of the preview song identification information in the listed sequence of the items constituting the preview song identification information within the continuous preview list information 110. In keeping with the preview song identification information newly selected as the preview song identification information of interest, the CPU 53 requests the corresponding preview data from the music data delivery server SV1. In turn, the CPU 53 receives the preview data in streaming mode from the music data delivery server SV1 through the network interface 62 and communication processing device 61, in that order. The CPU 53 causes the data processing device 60 to perform the reproduction process concurrently on the received preview data before getting the audio processing device 63 to subject the processed data to audio processing. The resulting preview signal is sent to the speakers 64. The speakers 64 under control of the CPU 53 audibly present the user with the preview song based on the preview signal.

As described, every time an end of the reproduction process on the preview data is detected, the CPU 53 automatically selects as the preview song identification information of interest yet another item of the preview song identification information within the continuous preview list information 110 (i.e., within the collected identification information list 108). In accordance with the preview song identification information newly selected as the preview song identification information of interest, the CPU 53 acquires the corresponding preview data from the music data delivery server SV1 for reproduction in streaming mode. In this manner, while the user is going through the song selection screens 70, 75, 80, 85, 88, 90 through 101 before eventually selecting a desired song, the CPU 53 may automatically prepare the continuous preview list information 110 independently of the user-initiated transitions through the screens 70, 75, 80, 85, 88, 90 through 101 and allow the user to preview a plurality of songs that are output in continuously automatic fashion in keeping with the prepared continuous preview list information 110. For the automatic and continuous output of preview songs, the CPU 53 may acquire cyclically a plurality of preview data items corresponding to the plurality of items constituting the preview song identification information within the continuous preview list information 110 so as to output the preview songs consecutively.

The CPU 53 may illustratively detect an end of the reproduction process on preview data (i.e., streaming reproduction) using suitable techniques outlined below. It should be noted that such techniques are only examples and not limitative of the present invention. Illustratively, the CPU 53 may detect an end of the reproduction process by suitably managing a buffer arrangement inside the data processing device 60 located upstream of the interface for the speakers 64 and for a digital output port. More specifically, the data processing device 60 may input preview data (i.e., linear PCM data) to a buffer, cause the preview data coming out of the buffer to enter a D/A converter in the audio processing device 63 for conversion into a preview signal (i.e., analog signal), and feed the resulting signal to the speakers 64. The data processing device 60 may further input the preview data (i.e., linear PCM data) coming out of an internal decryption device to a buffer in an interface controller, convert the preview data coming out of the buffer into a format compatible with a digital output transmission protocol for output through the interface controller, and output the data in digital form through the interface. The CPU 53 may thus detect the end of the reproduction process on the preview data when the writing of the preview data to the buffers is found to have ended and when all preview data written into the buffers is found to be output therefrom.

Alternatively, if an end time code exists in preview data, the CPU 53 may determine an end of the reproduction process on the preview data when the current time code detected during the reproduction is found to match the end time code. As another alternative, the CPU 53 may determine an end of the reproduction of preview data when the current time code detected during the reproduction is found to have stopped for a predetermined time period. As a further alternative, the CPU 53 may determine an end of the preview data reproduction when the level of the preview data being reproduced is found to remain below a predetermined threshold for a predetermined time period.

In addition, under control of the CPU 53, a particular operation key on the operation input device 50 for inputting an operation input signal to access (i.e., to request acquisition of) the buying page address of the song buying page information according to the continuous preview list information 110 may be associated with the buying page address corresponding to the preview data being reproduced (i.e., the buying page address corresponding to the preview song identification information about the preview song currently reproduced). This arrangement permits updating of the buying page address associated with the particular operation key in accordance with the preview data being reproduced. More specifically, while the CPU 53 is causing the data processing device 60 consecutively to reproduce preview data in keeping with the continuous preview list information 110, the user may operate the particular operation key. At that point, the CPU 53 sends a page information request signal requesting acquisition of the song buying page information to the music data delivery server SV1 through the communication processing device 61 and network interface 62, in that order, according to the buying page address associated with the operation key. In turn, the CPU 53 receives the song buying page information from the music data delivery server SV1 through the network interface 62 and communication processing device 61, in that order. The CPU 53 then causes the display device 58 to display the song buying screen corresponding to the currently reproduced preview data in the manner described above. In other words, when the user following the preview of a song finds the song desirable and wants to download relevant music data, the user need operate the particular operation key to get the song buying screen displayed and request the downloading of the music data under control of the CPU 53. There is no need for the user to undergo the transitions through the song selection screens 70, 75, 80, 85, 88, 90 through 101, in order to selectively designate the name of the desired song.

If the data processing device 60 does not reproduce preview data, then the CPU 53 deletes the buying page address associated with the particular operation key. It might happen that the user operates the particular operation key after the buying page address associated with that key has been deleted. In that case, the user's operation is rejected. The CPU 53 may also check to determine whether the speakers 64 are connected to the data storing/reproducing apparatus 21 through the audio processing device 63 and whether the previewed song for output through the speakers 64 is muted during the reproduction. It might also happen that the user operates the particular key while no preview song is found to be output from the speakers 64 because the reproduced preview song is muted or because the speakers 64 are disconnected. In this case, the user's operation on the particular operation key is also rejected even where the key is associated with the buying page address. As described above, if the user operates the particular operation key during preview of a desired song, the CPU 53 causes the display device 58 to display the song buying screen corresponding to the song being previewed so that the user may proceed to download the relevant music data. If the user inadvertently operates the particular key while no song is being previewed, the CPU 53 prevents any song buying page information from getting acquired. That is, the above-described arrangements allow the CPU 53 to prevent the user's unintentional downloading of music data.

Whether or not the speakers 64 are connected to the data storing/reproducing apparatus 21 may be determined by the CPU 53 checking for the presence or absence of an electrical connection with a relevant connector of the apparatus 21. Whether the currently previewed song is being muted may be determined by monitoring the gain in effect when amplifiers in the audio processing device 63 are being controlled. When preview data is not reproduced by the data processing device 60, the CPU 53 may not delete the buying page address associated with the particular operation key. Instead, the CPU 53 may associate the particular operation key with a network address which is retained in advance by the data storing/reproducing apparatus 21 and which specifies the available location of notification page information, i.e., the information indicating that the song buying page information to be acquired does not exist. The CPU 53 may then update the network address if the preview data is not reproduced by the data processing device 60. It might happen that the user operates the particular operation key while the data processing device 60 is not reproducing any preview data. In that case, the CPU 53 acquires the notification page information from the outside in accordance with the associated network address and causes the display device 58 to display a notification screen based on the acquired notification page information. The displayed screen tells the user that there is no song buying page information to be acquired.

In practice, the CPU 53 prepares the continuous preview list information 110 and performs a series of reproduction-related steps for the continuous and automatic output of preview data in accordance with the reproduction programs stored in the ROM 54 or on the hard disk of the hard disk drive 55. It should be noted that where the collection of one or a predetermined number of items of preview song identification information is to be followed immediately by reproduction of the corresponding preview data according to predetermined settings, the CPU 53 carries out parallelly the preparation of the continuous preview list information 110 and the reproduction of the preview data. The description that follows will thus explain the reproduction process involving two procedures: a procedure for preparing a continuous preview list whereby the continuous preview list information 110 is created, and a procedure for reproducing preview data.

Figure 17:
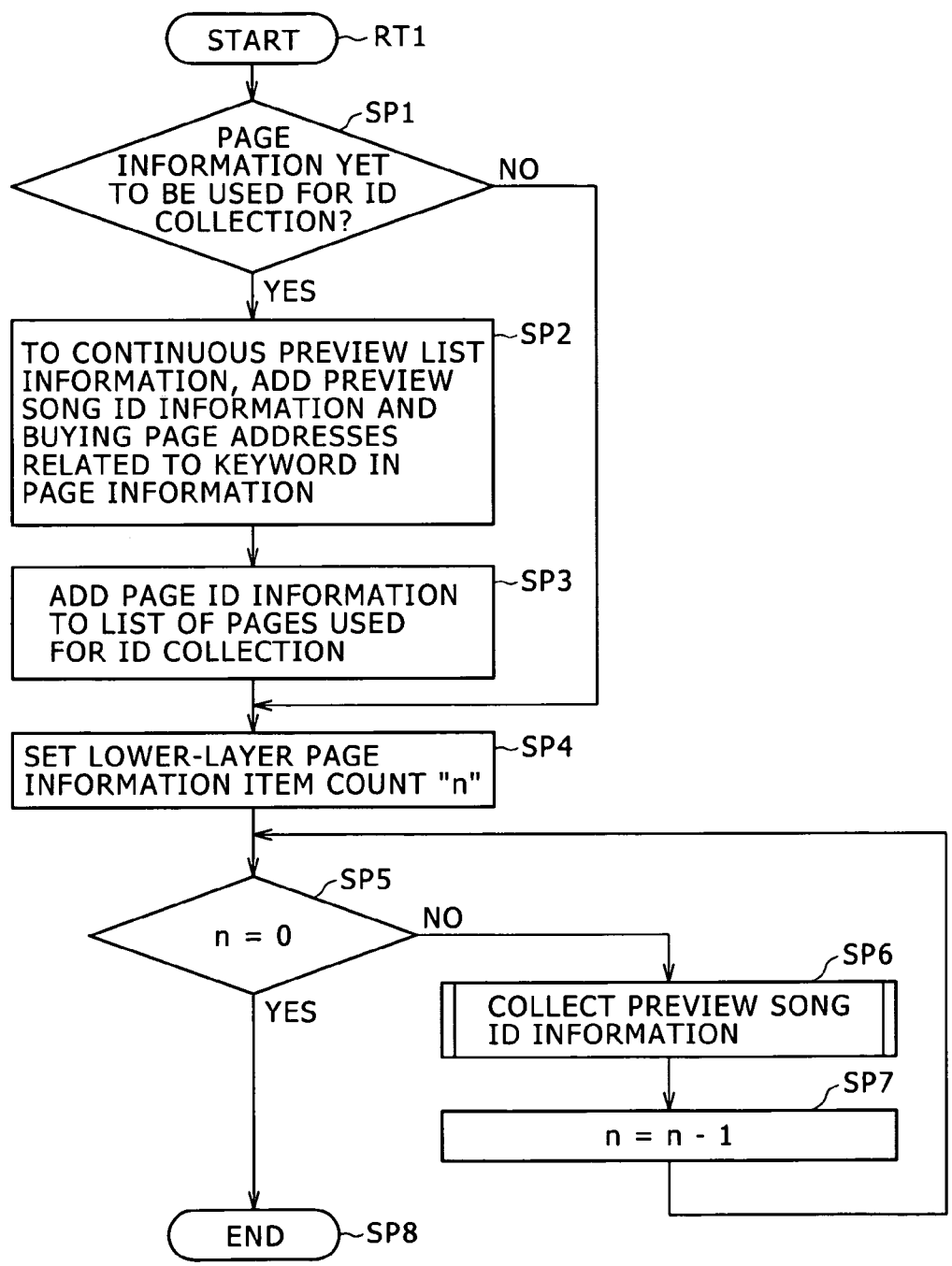
FIG. 17 is a flowchart of steps constituting one procedure for preparing the continuous preview list.

Upon detecting the acquisition of the highest-layer song selection page information 32 from the music data delivery server SV1, the CPU 53 starts executing a first procedure RT1 for preparing a continuous preview list shown in FIG. 17 in accordance with the reproduction programs. With the first continuous preview list preparation procedure RT1 started, the CPU 53 first goes to step SP1. In step SP1, the CPU 53 compares the page identification information in the song selection page information 32 received from the music data delivery server SV1, with the page identification information in the collection-used page list. The comparison allows the CPU 53 to determine whether the song selection page information 32 in question has yet to be used for collecting preview song identification information. If the result of the check in step SP1 is affirmative, that means the song selection page information 32 has yet to be utilized for collecting the preview song identification information. In this case, the CPU 53 goes to step SP2.

In step SP2, the CPU 53 collects the keyword-associated preview song identification information from the genre list information 33 as part of the song selection page information 32 along with the corresponding buying page addresses. The CPU 53 adds the collected preview song identification information and the corresponding buying page addresses to the continuous preview list information 110, before going to step SP3. In step SP3, the CPU 53 adds to the collection-used page list the page identification information included in the song selection page information 32 used to collect the preview song identification information at this point. Step SP3 is followed by step SP4.

In step SP4, the CPU 53 establishes the number "n" of items of song selection page information 32A and 32B one layer below the current song selection page information 32 (the number "n" is called the lower-layer page information item count), on the basis of the selection page addresses in the genre list information 33 as part of the song selection page information 32 used to collect the preview song identification information at this point. In step SP5, the CPU 53 checks to determine whether there has been exhausted, below the song selection page information 32 used to collect the preview song identification information at this point, any item of the song selection page information 32A and 32B yet to be used for collecting the preview song identification information. If the result of the check in step SP5 is negative, that means there still exists some item of the song selection page information 32A and 32B which is below the song selection page information 32 used to collect the preview song identification information and which has yet to be used for collecting the preview song identification information at this point. In that case, the CPU 53 goes to step SP6.

In step SP6, the CPU 53 requests from the music data delivery server SV1 one item of the song selection page information 32A or 32B in accordance with the selection page address in the genre list information 33 as part of the highest-layer song selection page information 32. Upon detecting acquisition of the song selection page information 32A or 32B, the CPU 53 carries out successively the same steps as step SP1 through step SP3 above. That is, the CPU 53 compares the page identification information in the song selection page information 32A or 32B acquired from the music data delivery server SV1, with the page identification information in the collection-used page list. The comparison allows the CPU 53 to determine whether the song selection page information 32A or 32B in question has yet to be used for collecting the preview song identification information. After verifying that the song selection page information 32A or 32B has yet to be utilized to collect the preview song identification information, the CPU 53 continues to collect the keyword-associated preview song identification information from the items of artist list information 39A and 39B in the song selection page information 32A or 32B along with the corresponding buying page addresses. What has been collected is added to the continuous preview list information 110. The CPU 53 supplements the collection-used page list with the page identification information included in the song selection page information 32A or 32B used to collect the preview song identification information at this point, before going to step SP7.

In step SP7, the CPU 53 updates the lower-layer page information item count "n" by subtracting "1" from the lower-layer page information item count "n" established in step SP4. From step SP7, control is returned to step SP5. As described, if there exist a plurality of items of song selection page information 32A and 32B below the song selection page information 32 used to collect the preview song identification information in step SP2, the CPU 53 performs steps SP5, SP6, SP7 and SP5 cyclically in that order to collect the preview song identification information from the all lower-layer items of song selection page information 32A and 32B along with the corresponding buying page addresses, thereby updating the continuous preview list information 110.

If the result of the check in step SP5 is affirmative, that signifies one of two things: on the one hand, all items of song selection page information 32A and 32B below the song selection page information 32 used to collect the preview song identification information in step SP2 may have been utilized for collecting the preview song identification information. On the other hand, there may be no item of song selection page information 32A and 32B below the song selection page information 32 used to collect the preview song identification information in step SP2. In either case, the CPU 53 goes to step SP8 and terminates the first continuous preview list preparation procedure RT1.

Carrying out the first continuous preview list preparation procedure RT1 once may not be sufficient for the CPU 53 to use up all song selection page information down to a predetermined layer for the keyword-based collection of preview song identification information. In that case, the CPU 53 may again execute the first continuous preview list preparation procedure RT1 to continue using the song selection page information down to the predetermined layer for collecting the preview song identification information along with the corresponding buying page addresses. In this manner, the CPU 53 may update the continuous preview list information 110. It should be noted that when again executing the first continuous preview list preparation procedure RT1, the CPU 53 in step SP1 starts collecting the preview song identification information from the song selection page information that was already used in step SP6 of the preceding execution of the procedure RT1 to collect the preview song identification information. That is, with the first continuous preview list preparation procedure RT1 started, the CPU 53 in step SP1 finds that the page identification information for the song selection page information from which to collect the preview song identification information is already stored in the collection-used page list, and concludes that the song selection page information in question has already been used to collect the preview song identification information according to the collection-used page list. Thus the CPU 53 goes from step SP1 to step SP4. It follows that when executing the first continuous preview list preparation procedure RT1 a plurality of number of times, the CPU 53 in a second or a subsequent pass need perform steps SP4 through SP8 successively. This allows the CPU 53 to use all layers of song selection page information down to the predetermined layer for collecting the preview song identification information. With the preview song identification information thus collected along with the corresponding buying page addresses, the CPU 53 may update the continuous preview list information 110.

Figure 18:
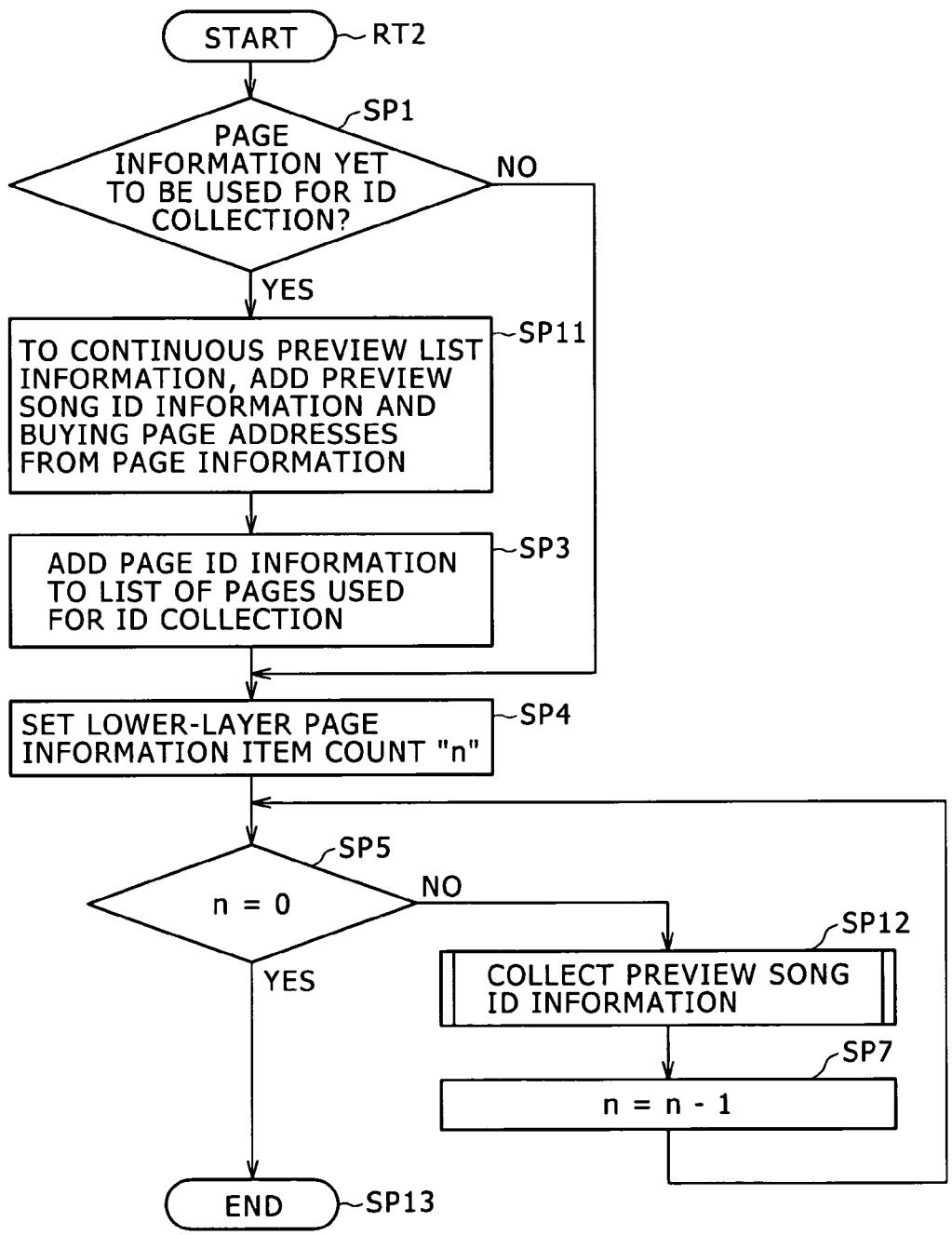
FIG. 18 is a flowchart of steps constituting another procedure for preparing the continuous preview list.

After completing the keyword-based collection of the preview song identification information from the song selection page information down to the predetermined layer as well as the corresponding buying page addresses, the CPU 53 starts executing a second procedure RT2 for preparing the continuous preview list shown in FIG. 18 in accordance with the reproduction programs. Of the steps constituting the flowchart of FIG. 18, those with their equivalents found in FIG. 17 are given like reference numerals. With the second continuous preview list preparation procedure RT2 started, the CPU 53 first goes to step SP1. In step SP1, the CPU 53 compares the page identification information in the lowest-layer song selection page information used to collect the preview song identification information during execution of the first continuous preview list preparation procedure RT1, with the page identification information in the collection-used page list. The comparison allows the CPU 53 to determine whether the song selection page information in question has yet to be used for collecting the preview song identification information. Since the page identification information included in the song selection page information is already stored in the collection-used page list, the result of the check in step SP1 is negative. The CPU 53 then skips steps SP11 and SP3 to reach step SP4. The CPU 53 performs step SP4 in the same manner as with the above-described first continuous preview list preparation procedure RT1 before reaching step SP5. If the result of the check in step SP5 turns out to be negative, the CPU 53 goes to step SP12.

In step SP12, the CPU 53 requests from the music data delivery server SV1 one item of the song selection page information in accordance with the selection page address in the items of song list information 45A through 45C (or items of artist list information 39A and 39B) as part of the song selection page information used in step SP1. Upon detecting acquisition of the song selection page information, the CPU 53 carries out successively the same steps as steps SP1, SP11 and SP3 above. That is, as in step SP1, the CPU 53 compares the page identification information in the song selection page information acquired from the music data delivery server SV1, with the page identification information in the collection-used page list. The comparison allows the CPU 53 to determine whether the song selection page information in question has yet to be used for collecting the preview song identification information. After verifying that the song selection page information has yet to be utilized in collecting the preview song identification information, the CPU 53 proceeds to carry out the same step as step SP11. At this point, the CPU 53 collects all preview song identification information from the items of song list information 45A through 45C (or from the items of artist list information 39A and 39B) in the song selection page information along with the corresponding buying page addresses. What has been collected is added to the continuous preview list information 110. The CPU 53 then supplements, as in step SP3, the collection-used page list with the page identification information included in the song selection page information used to collect the preview song identification information at this point, before going to step SP7.

As described, if there exist a plurality of items of song selection page information below the song selection page information used in step SP1, the CPU 53 performs steps SP5, SP12, SP7 and SP5 cyclically in that order to collect the preview song identification information from all the lower-layer items of song selection page information along with the corresponding buying page addresses, thereby updating the continuous preview list information 110. When the result of the check in step SP5 turns out to be affirmative, the CPU 53 goes to step SP13 to terminate the second continuous preview list preparation procedure RT2.

If there are found a plurality of items of the lowest-layer song selection page information used to collect the preview song identification information during execution of the first continuous preview list preparation procedure RT1, then the CPU 53 carries out the second continuous preview list preparation procedure RT2 as many times as the number of items of the lowest-layer song selection page information. When the second continuous preview list preparation procedure RT2 is to be executed in this manner, the CPU 53 uses the items of the lowest-layer song selection page information one after another in step SP1. Simply performing the second continuous preview list preparation procedure RT2 with the items of the lowest-layer song selection page information used one after another in step SP1 may not be sufficient for the CPU 53 to use up all song selection page information down to the predetermined layer (e.g., the lowest layer) for the collection of preview song identification information. In that case, the CPU 53 may again execute the second continuous preview list preparation procedure RT2 to continue using all layers of song selection page information down to the predetermined layer for collecting the preview song identification information along with the corresponding buying page addresses. In this manner, the continuous preview list information 110 is updated.

When carrying out the second continuous preview list preparation procedure RT2 by use of the song selection page information down to the predetermined layer, the CPU 53 in step SP1 again starts collecting the preview song identification information from the same song selection page information that was already used in step SP12 during the preceding execution of the procedure RT2. That is, as in the case of the first continuous preview list preparation procedure RT1, with the second continuous preview list preparation procedure RT2 started, the CPU 53 in step SP1 finds that the page identification information for the song selection page information used to collect the preview song identification information is already stored in the collection-used page list, and concludes that the song selection page information in question has already been used to collect the preview song identification information according to the collection-used page list. Thus the CPU 53 goes from step SP1 to step SP4. It follows that when executing the second continuous preview list preparation procedure RT2 following the first continuous preview list preparation procedure RT1, the CPU 53 need perform steps SP4 through SP13 successively. This allows the CPU 53 to use all layers of song selection page information down to the predetermined layer for collecting the preview song identification information. With the preview song identification information thus collected along with the corresponding buying page addresses, the CPU 53 may update the continuous preview list information 110.

Figure 19:
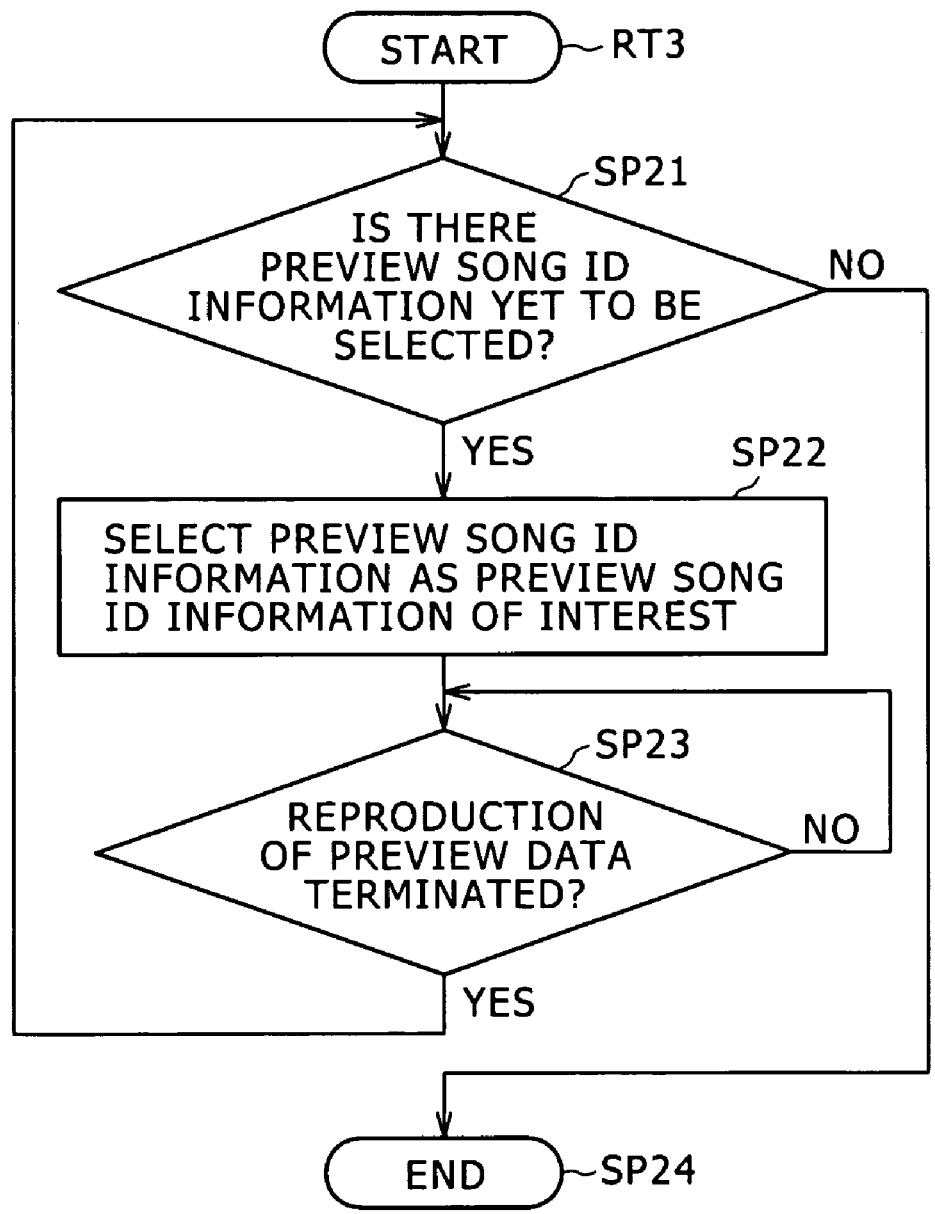
FIG. 19 is a flowchart of steps constituting a procedure for reproducing previewed data.

After collecting a first item or a predetermined number of items of preview song identification information from all layers of song selection page information 32, 32A through 32BA according to predetermined settings, or after collecting the preview song identification information from all layers of song selection page information 32, 32A through 32BA, the CPU 53 starts executing a procedure RT3 for preview data reproduction shown in FIG. 19 in accordance with the reproduction programs. With the preview data reproduction procedure RT3 started, the CPU 53 goes to step SP21 and checks to determine whether there exists any preview song identification information to be selected as the preview song identification information of interest from among a plurality of items of the preview song identification information in the continuous preview list information 110 (i.e., collected identification information list 108), illustratively in accordance with the listed sequence of such items. If the result of the check in step SP21 is affirmative, there still exists some preview song identification information yet to be selected as the preview song identification information of interest in the continuous preview list information 110. In that case, the CPU 53 goes to step SP22.

In step SP22, the CPU 53 automatically selects as the preview song identification information of interest one of the listed sequence of items constituting the preview song identification information in the continuous preview list information 110. In step SP23, the CPU 53 sends a preview data request signal to the music data delivery server SV1 through the communication processing device 61 and network interface 62, in that order, according to the preview song identification information selected as the preview song identification information of interest. In turn, the CPU 53 receives the corresponding preview data in streaming mode from the music data delivery server SV1 through the network interface 62 and communication processing device 61, in that order. Concurrently, the CPU 53 causes the data processing device 60 and audio processing device 63 to convert the received data into a preview signal for output to the speakers 64. The speakers 64 under control of the CPU 53 outputs the preview song for sampling by the user. On detecting an end of the reproduction process on the preview data through the data processing device 60, the CPU 53 returns to step SP21.

Thereafter, until the result of the check in step SP21 becomes negative, the CPU 53 repeats steps SP21, SP22, SP23 and SP21 cyclically in that order. In so doing, the CPU 53 automatically selects a plurality of items of preview song identification information one after another as the preview song identification information of interest, acquires the preview data corresponding to the selected preview song identification information of interest from the music data delivery server SV1, and outputs the acquired data continuously and automatically as preview songs. When the result of the check in step SP21 becomes negative, that means all items of preview song identification information in the continuous preview list information 110 have been selected as the preview song identification of interest and that all preview data items corresponding to the selected preview song identification information have been output continuously and automatically. In that case, the CPU 53 goes to step SP24 and terminates the preview data reproduction procedure RT3. If the user has yet to select a desired song even after the output of the preview data corresponding to all preview song identification information in the continuous preview list information 110, the CPU 53 again carries out the preview data reproduction procedure RT3.

As described, during the user's selection of desired songs, the CPU 53 allows the user to hear preview songs by acquiring in a cyclically repeated manner a plurality of preview data items corresponding to the plurality of items of preview song identification information in the continuous preview list information 110. If the user stops selecting desired songs during execution of the preview data reproduction procedure RT3, the CPU 53 terminates the procedure RT3 at that point and ends the continuous and automatic output of preview songs. If the user selects a given preview song during the continuous and automatic output of preview songs and requests reproduction of the corresponding preview data, the CPU 53 halts the ongoing automatic output of preview songs and starts reproducing the preview data corresponding to the preview song selected by the user. On detecting an end of the reproduction of the preview data, the CPU 53 resumes the continuous and automatic output of preview songs based on the continuous preview list information 110. When resuming the continuous and automatic output of preview songs, the CPU 53 restarts the currently suspended preview song either from its beginning or from where it was left off, or outputs the preview song corresponding to a given item of the preview song identification information in the continuous preview list information 110.

If the user acquires through appropriate operations any song buying page information during the continuous and automatic output of preview songs and if the preview song being automatically output at that point corresponds to the music data that can be bought (i.e., downloadable) through the song buying page information, the CPU 53 continues to output the current preview song automatically and repeatedly while a buying process is being performed. Upon detecting an end of the buying process, the CPU 53 returns to the song selection screens 70, 75, 80, 85, 88, 90 through 101 on display and resumes the continuous and automatic output of preview songs performed as usual by use of the continuous preview list information 110.

If any song buying page information is acquired by the user and if the preview song being automatically output at that point differs from the music data that can be bought through the acquired song buying page information, the CPU 53 halts the ongoing automatic output of the preview song in question, and outputs repeatedly and continuously the preview songs corresponding to the music data that can be bought through the music buying page information in question while the buying process is being performed by use of the song buying page information. On detecting an end of the buying process, the CPU 53 returns to the song selection screens 70, 75, 80, 85, 88, 90 through 101 on display and resumes the continuous and automatic output of preview songs through the use of the continuous preview list information 110. When resuming the continuous and automatic output of preview songs, the CPU 53 restarts the currently suspended preview song either from its beginning or from where it was left off, or outputs the preview song corresponding to a given item of the preview song identification information in the continuous preview list information 110.

In the above-described setup, every time the data storing/reproducing apparatus 21 acquires music data from a CD or from the music data delivery server SV1 for storage onto the hard disk, the apparatus 21 prepares a keyword by statically processing the stored music data by type. In this state, the data storing/reproducing apparatus 21 may detect acquisition of the highest-layer song selection page information 32 sent from the music data delivery server SV1 in response to a user-initiated page acquisition request. In such a case, the data storing/reproducing apparatus 21 prepares a collected identification information list 108 by collecting keyword-associated preview song identification information from the highest-layer song selection page information 32. The CPU 53 also acquires from the music data delivery server SV1 the items of song selection page information 32A and 32B that can be linked from the highest-layer song selection page information 32, collects the keyword-associated preview song identification information from the acquired items of song selection page information 32A and 32B, and adds the collected information to the collected identification information list 108. In this manner, when detecting acquisition of the highest-layer song selection page information 32, the data storing/reproducing apparatus 21 prepares the collected identification information list 108 by collecting the keyword-associated preview song identification information from the highest-layer song selection page information 32 as well as from the lower layers of song selection page information.

After completing the collection of the keyword-associated preview song identification information, the data storing/reproducing apparatus 21 acquires successively from the music data delivery server SV1 the song selection page information ranging from one layer below a predetermined layer to another predetermined layer (e.g., the lowest layer). Concurrently, the data storing/reproducing apparatus 21 collects all preview song identification information from the acquired song selection page information and adds what has been collected to the collected identification information list 108. The data storing/reproducing apparatus 21 automatically selects one of the multiple items constituting the preview song identification information in the collected identification information list 108 as the preview song identification information of interest, and requests from the music data delivery server SV1 the preview data corresponding to the preview song identification information selected as the preview song identification information of interest. In turn, the data storing/reproducing apparatus 21 acquires the corresponding preview data sent in streaming mode from the music data delivery server SV1 and subjects the acquired data to reproduction and audio processing for output as a preview song. On detecting an end of the reproduction of the preview data, the data storing/reproducing apparatus 21 again selects automatically another one of the multiple items constituting the preview song identification information in the collected identification information list 108, and requests from the music data delivery server SV1 new preview data corresponding to the preview song identification information selected as the preview song identification information of interest. In turn, the data storing/reproducing apparatus 21 acquires the corresponding new preview data sent in streaming mode from the music data delivery server SV1 and subjects the acquired data to reproduction and audio processing for output as a new preview song. In this manner, the data storing/reproducing apparatus 21 acquires successively a plurality of preview data items corresponding to the plurality of items of preview song identification information in the collected identification information list 108, and outputs the acquired data items as preview songs continuously and automatically.

As described, when detecting acquisition of the highest-layer song selection page information 32 sent from the music data delivery server SV1 in response to the user-initiated page acquisition request, the data storing/reproducing apparatus 21 prepares the collected identification information list 108 by collecting the relevant preview song identification information from a plurality of layers of song selection page information 32, 32A through 32BA. At the same time, the data storing/reproducing apparatus 21 acquires successively a plurality of preview data items corresponding to the plurality of items of preview song identification information in the collected identification information list 108 thus prepared, before reproducing the acquired preview data items. The user need perform operations to acquire the highest-layer song selection page information 32. This prompts the data storing/reproducing apparatus 21 to acquire and reproduce automatically the preview data corresponding to the preview song identification information in a plurality of layers of song selection page information 32, 32A through 32BA; there is no need for the user to carry out additional operations to acquire the multiple layers of song selection page information 32, 32A through 32BA for preview song selection or to select the preview songs.

In the above setup, upon detecting acquisition of the highest-layer song selection page information 32, the data storing/reproducing apparatus 21 prepares the collected identification information list 108 by collecting the preview song identification information from the acquired information 32. The data storing/reproducing apparatus 21 also acquires automatically the items of song selection page information 32A through 32BA lower than the highest layer, collects the preview song identification information from the acquired items of song selection page information 32A through 32BA, and adds what has been collected to the collected identification information list 108. The data storing/reproducing apparatus 21 proceeds to acquire and reproduce a plurality of preview data items corresponding to the plurality of items of preview song identification information in the collected identification information list 108 thus prepared. As a result, the user need perform operations to acquire the highest-layer song selection page information 32. This prompts the data storing/reproducing apparatus 21 to acquire and reproduce automatically the preview data corresponding to the preview song identification information in multiple layers of song selection page information 32, 32A through 32BA. In this manner, the data storing/reproducing apparatus 21 appreciably simplifies the operations to be carried out by the user for reproduction of preview data.

When collecting a first item of preview song identification information from the items of song selection page information 32, 32A through 32B according to predetermined settings, the data storing/reproducing apparatus 21 may be prompted to start acquiring the preview data corresponding to the collected preview song identification information and initiating a reproduction process concurrently. In that case, the data storing/reproducing apparatus 21 may be configured to start reproducing the preview data at the earliest possible time after the start of acquisition of the highest-layer song selection page information 32. That is, the data storing/reproducing apparatus 21 may be arranged to let the user start hearing preview songs with a minimum of wait following the start of acquisition of the highest-layer song selection page information 32. Furthermore, after collecting a predetermined number of items of preview song identification information from the items of song selection page information 32, 32A through 32BA according to predetermined settings, the data storing/reproducing apparatus 21 may be prompted to start acquiring the preview data corresponding to the collected items of preview song identification information and reproducing the acquired preview data concurrently. In that case, the data storing/reproducing apparatus 21 may be configured in the same manner as above to let the user start hearing preview songs with a minimum of wait after the start of acquisition of the highest-layer song selection page information 32.

As discussed above with reference to FIG. 19, it might happen that the preview song identification information to be selected as the preview song identification information of interest is exhausted in the collected identification information list 108 during execution of the preview data reproduction procedure RT3 and before the user's selection of a desired song. In that case, the data storing/reproducing apparatus 21 brings the preview data reproduction procedure RT3 to an end and then restarts the procedure RT3. There may be cases where there is not much preview song identification information corresponding to the preview data in a plurality of layers of song selection page information 32, 32A through 32BA so that there occurs an idle time between the collection of one item of the preview song identification information and the collection of another item. In such cases, the data storing/reproducing apparatus 21 carries out the preview data reproduction procedure RT3 repeatedly. The repetitive execution of the procedure RT3 raises this possibility: that the earlier the collection of preview song identification information following acquisition of the highest-layer song selection page information 32, the larger the number of times the preview data corresponding to the collected preview song identification information is reproduced; and that the later the collection of preview song identification information following acquisition of the highest-layer song selection page information 32, the smaller the number of times the preview data corresponding to the collected preview song identification information is reproduced. That is, the data storing/reproducing apparatus 21 allows the user to hear more often the preview songs corresponding to the preview song identification information collected at earlier times following the detection of acquisition of the highest-layer song selection page information 32; the user is allowed to hear less often the preview songs corresponding to the preview song identification information collected at later times following the detection of acquisition of the highest-layer song selection page information 32. The user may well have the feeling that the same preview songs are being reproduced repetitively. However, according to predetermined setting, the data storing/reproducing apparatus 21 may, at the end of the collection of preview song identification information from the layers of song selection page information 32, 32A through 32BA, acquire and concurrently reproduce the preview data corresponding to the collected preview song identification information. When executing the preview data reproduction procedure RT3 in accordance with such predetermined settings, the data storing/reproducing apparatus 21 may be configured to avoid letting the preview songs corresponding to individual items of preview song identification information be reproduced different numbers of times depending on when these items were collected from a plurality of layers of song selection page information 32, 32A through 32BA. The data storing/reproducing apparatus 21 thus allows the user to hear a plurality of preview songs in a substantially uniform manner during the selection of desired songs; the user will not get the feeling that the limited preview songs are being reproduced repeatedly.

In executing the preview data reproduction procedure RT3, the data storing/reproducing apparatus 21 selects one of a plurality of items of preview song identification information in the collected identification information list 108 as the preview song identification information of interest, and acquires and reproduces the preview data corresponding to the item of preview song identification information selected as the preview song identification information of interest. Upon detecting an end of the reproduction of the preview data, the storing/reproducing apparatus 21 automatically selects another one of the multiple items of preview song identification information in the collected identification information list 108 as the preview song identification information of interest. In this manner, the data storing/reproducing apparatus 21 successively acquires and reproduces a plurality of preview data items corresponding to the plurality of items of preview song identification information in the collected identification information list 108. Multiple preview songs corresponding to the multiple preview data items are output continuously and automatically for sampling by the user; there is no need for the user to perform additional operations.

By repeatedly and cyclically reproducing the multiple preview data items corresponding to the multiple items of preview song identification information in the collected identification information list 108, the data storing/reproducing apparatus 21 avoids letting the reproduction of preview data terminate halfway while the user is still selecting desired songs. In other words, the data storing/reproducing apparatus 21 can present the user with a plurality of songs authorized for preview as background music during the user's selection of desired songs.

In addition, the data storing/reproducing apparatus 21 associates a particular operation key with a buying page address indicating where the song (i.e., music data) buying page information corresponding to the currently reproduced preview data is availably located, and updates the buying page address linked with the particular operation key in keeping with the preview data being reproduced. With this arrangement in effect, the user need perate the particular operation key to acquire with ease the song buying page information corresponding to the song which is being reproduced for preview and which has aroused the user's interest. Acquisition of the information is accomplished regardless of which of the song selection screens 70, 75, 80, 85, 88, 90 through 101 is currently on display (i.e., regardless of the presence or absence of any screen display).

When preview data is not reproduced, the data storing/reproducing apparatus 21 deletes the buying page address associated with the particular operation key and rejects any operation that may be performed on that key. When preview songs are not actually output from the speakers 64 during the reproduction process of preview data (i.e., when the user is not actually hearing preview songs), the data storing/reproducing apparatus 21 also rejects any operation on the particular operation key. In this manner, the data storing/reproducing apparatus 21 avoids having any song buying page information acquired inadvertently if the particular operation key is operated unintentionally while preview songs are not actually presented to the user. In other words, when the user is not hearing any preview song, the data storing/reproducing apparatus 21 makes sure substantially to prevent the music data of any song not selected by the user from getting downloaded as a result of a series of inadvertent operations on the keys including the particular operation key.

(4) Other embodiments

As the above-described third embodiment of the present invention, the data storing/reproducing apparatus 21 was shown to collect keyword-associated preview song identification information from the highest-layer song selection page information 32 down to a predetermined layer of the page information, and to collect the preview song identification information without using any keyword from the song selection page information in the layer just below the predetermined layer down to, say, the lowest layer. Alternatively, the data storing/reproducing apparatus 21 may collect the keyword-free preview song identification information from the highest-layer song selection page information 32 down to a predetermined layer of the page information. Where the keyword-free preview song identification information is collected without using any keyword, the data storing/reproducing apparatus 21 may have at least two items of song selection page information designated illustratively by layer or by type at the user's discretion for use in collecting the preview song identification information. The data storing/reproducing apparatus 21 may then collect the preview song identification information without using any keyword from at least the designated two items of song selection page information. While collecting the preview song identification information without using any keyword from at least the designated two items of song selection page information, the data storing/reproducing apparatus 21 may terminate the collection after acquiring a predetermined number of items of the preview song identification information, or those items of the preview song identification information which correspond to the preview data to be reproduced over a predetermined time period. By having the predetermined number of items or the predetermined reproduction time kept down to a minimum, the data storing/reproducing apparatus 21 may minimize the storage capacity that is needed temporarily to accommodate the continuous preview list information 110 and may also simplify the steps to collect the preview song identification information (i.e., steps constituting the continuous preview list preparation procedure). The curtailed storage capacity requirement and the simplified collection steps translate into a reduced processing load on the CPU 53.

As the third-embodiment of the present invention, the data storing/reproducing apparatus 21 was also shown outputting continuously and automatically preview songs while acquiring preview data from the music data delivery server SV1. Alternatively, the data storing/reproducing apparatus 21 may be configured to acquire streaming content data such as sampled data about diverse contents including moving pictures, still pictures, video games, audio data, text data, and program data from the outside, and to output the acquired data continuously and automatically. As another alternative, the data storing/reproducing apparatus 21 may be configured to acquire content data (audio data, video data, image data, text data, or program data) as streaming content data and to output the acquired data continuously and automatically.

As the third embodiment of the present invention, the data storing/reproducing apparatus 21 was also shown to collect the preview song identification information in unmodified form from a plurality of layers of song selection page information 32, 32A through 32BA. Alternatively, the data storing/reproducing apparatus 21 may be applied to a setup where the items of preview song identification information corresponding to the preview data in different formats such as compression coding, encryption, etc., are included in a plurality of layers of song selection page information 32, 32A through 32BA, together with information representative of the formats in use. With that setup in effect, the data storing/reproducing apparatus 21 may selectively collect, from the multiple layers of song selection page information 32, 32A through 32BA, only those items of preview song identification information which correspond to the preview data in a format compatible with this apparatus 21 for reproduction. In that case, the music data delivery server SV1 may offer preview data in various formats without regard to any specific format that should be compatible with the individual preview data acquisition side (i.e., data storing/reproducing apparatus 21) for reproduction (in other words, the server SV1 need not carry out complex operations to unify the varying formats of preview data).

In the above-described first through third embodiments of the present invention, the inventive reproducing apparatus was shown applied to the reproducing apparatus 1 and data storing/reproducing apparatus 21 discussed with reference to FIGS. 1 through 19. Alternatively, the present invention may be practiced with an extensive range of other suitable reproducing apparatuses such as reproduction-capable information processing apparatuses including personal computers, mobile phones, PDAs (personal digital assistants), video game machines, compact disc players, DVD (digital versatile disc) players, and hard disk recorders. More specifically, in the first through the third embodiments of the invention described above, the functional circuit blocks and hardware circuit blocks discussed with reference to FIGS. 1 through 19 were shown incorporated in the reproducing apparatus 1 and data storing/reproducing apparatus 21. Alternatively, the inventive functional circuit blocks and hardware circuit blocks may be applied to diverse kinds of equipment other than the reproducing apparatus 1 or data storing/reproducing apparatus 21, such as personal computers and mobile phones. Any suitable equipment incorporating these functional circuit blocks and hardware circuit blocks may carry out the same processes as the above-described reproducing apparatus 1 and data storing/reproducing apparatus 21 of the invention.

In the first through the third embodiments of the invention discussed above, the detection device 2 (203) of the reproducing apparatus 1 and the CPU 53 of the data storing/reproducing apparatus 21, as described with reference to FIGS. 1 through 19, were shown to be used as the detection block configured to acquire first page information. Alternatively, the present invention may be practiced with an extensive range of other suitable detection arrangements such as hardware-based detection circuits for detecting the acquisition of the first page information.

In the first through the third embodiments of the invention discussed above, the list preparation device 3 (204) of the reproducing apparatus 1 and the CPU 53 of the data storing/reproducing apparatus 21, as described with reference to FIGS. 1 through 19, were shown to be used as the list preparation device configured to prepare a list of content identification information collected at least from the first page information and from second page information linked from the first page information when the detection device detects the acquisition of the first page information, the content identification information being such as to indicate where streaming content data is availably located. Alternatively, the present invention may be practiced with an extensive range of other list preparation arrangements such as hardware-based list preparation circuits for collecting content identification information from at least the first and the second page information.

In the first through the third embodiments of the invention depicted above, the reproduction device 4 (205) of the reproducing apparatus 1 and the data processing device 60 of the data storing/reproducing apparatus 21, as discussed with reference to FIGS. 1 through 19, were shown to be used as the reproduction block configured to acquire and reproduce the stream content data corresponding to the content identification information in the list prepared by the list preparation device. Alternatively, the present invention may be practiced with an extensive range of other reproduction arrangements such as hardware-based reproduction circuits for acquiring and reproducing the streaming content data corresponding to the content identification information in the list.

In the first through the third embodiments of the invention described above, the operation device 5 (207) of the reproducing apparatus 1 and the operation input device 50 of the data storing/reproducing apparatus 21, as explained with reference to FIGS. 1 through 19, were shown to be used as the operation device configured to gain access to a network address in association with a particular operation. Alternatively, the present invention may be practiced with an extensive range of other operation arrangements such as touch-sensitive panels.

In the first through the third embodiments of the invention discussed above, the control device 6 (208) of the reproducing apparatus 1 and the CPU 53 of the data storing/reproducing apparatus 21, as described with reference to FIGS. 1 through 19, were shown to be used as the control device configured to update the network address associated with the operation device in accordance with the streaming content data reproduced by the reproduction device. Alternatively, the present invention may be practiced with an extensive range of other control arrangements such as hardware-based control circuits for updating the network address associated with the operation device in keeping with the currently reproduced streaming content data.

Furthermore, in the first through the third embodiments of the invention discussed above, the audio processing device 7 (209) of the reproducing apparatus 1 and the audio processing device 63 of the data storing/reproducing apparatus 21, as described with reference to FIGS. 1 through 19, were shown to be used as the audio processing device configured to convert into an audio signal the reproduced data acquired by the reproduction device from streaming content data. Alternatively, the present invention may be practiced with an extensive range of other audio processing arrangements such as digital-to-analog converters.

It should be understood by those skilled in the art that various modifications, combinations, sub-combinations and alterations may occur depending on design requirements and other factor in so far as they are within the scope of the appended claims or the equivalents thereof.

What is claimed is:

1. An apparatus comprising:
   a detection device configured to detect acquisition of first page information;
   a list preparation device configured to prepare a list of content identification information collected at least from said first page information and from second page information linked from said first page information when said detection device detects the acquisition of said first page information, said content identification information being such as to indicate where streaming content data is availably located; and
   a reproduction device configured to reproduce said streaming content data upon acquisition, said streaming content data corresponding to said content identification information in the list prepared by said list preparation device.

2. The apparatus according to claim 1, wherein, when one item of said content identification information is collected by said list preparation device from at least said first and said second page information, said reproduction device starts acquiring that item of said streaming content data which corresponds to said one item of said content identification information.

3. The apparatus according to claim 1, wherein, when a predetermined number of items of said content identification information are collected by said list preparation device from at least said first and said second page information, said reproduction device starts acquiring said predetermined number of items of said streaming content data which correspond to said predetermined number of items of said content identification information.

4. The apparatus according to claim 1, wherein, after said list preparation device has collected said content identification information from at least said first and said second page information, said reproduction device starts acquiring said streaming content data corresponding to said content identification information in said list.

5. The apparatus according to claim 1, wherein said reproduction device repeatedly acquires and reproduces said streaming content data corresponding to said content identification information in said list prepared by said list preparation device.

6. The apparatus according to claim 1,
   wherein said reproduction device selects as the content identification information of interest one item of said content identification information in said list prepared by said list preparation device, acquires that item of said streaming content data which corresponds to the selected content identification information of interest, and reproduces the acquired item of said streaming content data, and
   wherein, upon detecting an end of the reproduction of said acquired item of said streaming content data, said reproduction device automatically selects as the content identification information of interest another item of said content identification information in said list, and proceeds likewise to acquire and reproduce that item of said streaming content data which corresponds to the selected content identification information of interest,
   whereby a plurality of items of said streaming content data corresponding to a plurality of items of said content identification information in said list are acquired and reproduced successively.

7. The apparatus according to claim 1, further comprising:
   an operation device configured to associate specific operations with specific network addresses; and
   a control device configured to update said network addresses associated with said specific operations of said operation device in keeping with said streaming content data being reproduced by said reproduction device.

8. The apparatus according to claim 7, wherein, if said streaming content data is not reproduced by said reproduction device, said control device deletes said network addresses associated with said specific operations of said operation device.

9. The apparatus according to claim 8, wherein, if said network addresses associated with said specific operations of said operation device are deleted, said control device rejects said specific operations to be performed on said operation device.

10. The apparatus according to claim 7, further comprising:
    an audio processing device configured to convert into an audio signal reproduced data acquired by said reproduction device reproducing said streaming content data,
    wherein, if said audio processing device does not output said audio signal while said reproduction device is reproducing said streaming content data, said control device rejects said specific operations to be performed on said operation device.

11. The apparatus according to claim 1, wherein said list preparation device prepares said list of said content identification information collected at least from said first and said second page information, said content identification information being such as to indicate which items of said streaming content data are reproducible by said reproduction device and where the reproducible items of said streaming content data are availably located.

12. The apparatus according to claim 1, wherein said list preparation device prepares said list of said content identification information collected at least from said first and said second page information, said content identification information being such as to indicate which items of said streaming content data are available for preview and where the available items of said streaming content data are availably located.

13. The apparatus according to claim 1, further comprising:
a keyword preparation device configured to prepare a keyword based on content data stored on a storage medium,
wherein said list preparation device prepares a list of content identification information collected at least from said first page information and from second page information linked from said first page information when said detection device detects the acquisition of said first page information, said content identification information being such as to indicate where the streaming content data associated with said keyword prepared by said keyword preparation device is availably located.

14. The apparatus according to claim 13,
wherein said keyword preparation device prepares a keyword formed by either artist information or genre information corresponding to said content data stored on said storage medium.

15. The apparatus according to claim 14, further comprising:
a computation device configured to compute the number of items constituting said content data either by artist information or by genre information when said content data stored on said storage medium is updated, said computation device further storing the computed number of items onto said storage medium,
wherein said keyword preparation device prepares the keyword formed by either said artist information or said genre information of which the number of items to be stored onto said storage medium is at least equal to a predetermined number.

16. A reproducing method performed on a processor comprising the steps of:
detecting acquisition of first page information;
preparing a list with the processor of content identification information collected at least from said first page information and from second page information linked from said first page information when the acquisition of said first page information is detected in said detecting step, said content identification information being such as to indicate where streaming content data is availably located; and
reproducing said streaming content data upon acquisition, said streaming content data corresponding to said content identification information in the list prepared in said list preparing step.

17. A computer-readable storage medium encoded with instructions, which when executed by a computer, cause a processor to execute a method for reproducing media data, said method comprising:
detecting acquisition of first page information;
preparing a list of content identification information collected at least from said first page information and from second page information linked from said first page information when the acquisition of said first page information is detected in said detecting step, said content identification information being such as to indicate where streaming content data is availably located; and
reproducing said streaming content data upon acquisition, said streaming content data corresponding to said content identification information in the list prepared in said list preparing step.

* * * * *